(12) United States Patent  (10) Patent No.: US 8,711,257 B2
Kawai et al.  (45) Date of Patent: Apr. 29, 2014

(54) COLOR IMAGING DEVICE

(71) Applicant: FUJIFILM Corporation, Tokyo (JP)

(72) Inventors: Tomoyuki Kawai, Saitama (JP);
Kenkichi Hayashi, Saitama (JP); Seiji Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/971,563

(22) Filed: Aug. 20, 2013

(65) Prior Publication Data
US 2013/0335603 A1 Dec. 19, 2013

Related U.S. Application Data

(63) Continuation of application No. PCT/JP2012/053777, filed on Feb. 17, 2012.

(30) Foreign Application Priority Data

Feb. 21, 2011 (JP) ................................. 2011-034627
Jul. 25, 2011 (JP) ................................. 2011-162415
Dec. 27, 2011 (JP) ................................. 2011-286009

(51) Int. Cl.
*H04N 9/07* (2006.01)
*H04N 9/083* (2006.01)
*H04N 3/14* (2006.01)
*H04N 5/335* (2011.01)
*H04N 9/04* (2006.01)

(52) U.S. Cl.
USPC ........... 348/277; 348/272; 348/266; 348/280; 348/281; 348/282

(58) Field of Classification Search
CPC .............................................. H04N 2209/045
USPC ............................................................ 348/277
See application file for complete search history.

(56) References Cited

U.S. PATENT DOCUMENTS 7,688,368 B2 * 3/2010 Kijima et al. ................. 348/272
7,769,230 B2   8/2010 Pillman et al.
(Continued)

FOREIGN PATENT DOCUMENTS

JP  08-023543 A  1/1996
JP  11-285012 A  10/1999
JP  2000-308080 A  11/2000
JP  2005-136766 A  5/2005
(Continued)

OTHER PUBLICATIONS

International Search Report, issued in PCT/JP2012/053777, dated Apr. 3, 2012.

(Continued)

*Primary Examiner* — Chia-Wei A Chen
(74) *Attorney, Agent, or Firm* — Birch, Stewart, Kolasch & Birch, LLP

(57) ABSTRACT

A color filter array of a color imaging device is formed by repeatedly arranging a basic array pattern in which RGB filters are arrayed in an array pattern of 8×12 pixels, in a horizontal direction and a vertical direction. The basic array pattern is arranged in a matrix manner in the horizontal direction and/or the vertical direction and includes A array to D array having an array pattern of 4×4 pixels. In each of arrays, G filters are arranged in a checkered pattern and the arrangements of G filters have a mirror image relationship between arrays that are adjacent to each other.

9 Claims, 20 Drawing Sheets

(56) References Cited

U.S. PATENT DOCUMENTS

| | | | |
|---|---|---|---|
| 8,508,633 B2 * | 8/2013 | Hirose | 348/277 |
| 2002/0135689 A1 * | 9/2002 | Uya | 348/280 |
| 2002/0149686 A1 | 10/2002 | Taubman | |
| 2003/0128409 A1 * | 7/2003 | Vook et al. | 358/513 |
| 2006/0139469 A1 * | 6/2006 | Yokota et al. | 348/272 |
| 2006/0233439 A1 * | 10/2006 | Zhao | 382/168 |
| 2007/0177236 A1 * | 8/2007 | Kijima et al. | 358/514 |
| 2009/0027527 A1 | 1/2009 | Pang et al. | |

FOREIGN PATENT DOCUMENTS

| | | |
|---|---|---|
| JP | 2007-306490 A | 11/2007 |
| JP | 2009-027684 A | 2/2009 |
| JP | 2010-512048 A | 4/2010 |
| WO | WO 2008/066698 A2 | 6/2008 |

OTHER PUBLICATIONS

Written Opinion of the International Searching Authority, issued in PCT/JP2012/053777, dated Apr. 3, 2012.

* cited by examiner

9(DIGITAL CAMERA)

COLOR IMAGING DEVICE

CROSS-REFERENCE TO RELATED APPLICATIONS

This application is a PCT Bypass continuation application and claims the priority benefit under 35 U.S.C. §120 of PCT Application No. PCT/JP2012/053777 filed on Feb. 17, 2012 which application designates the U.S., and also claims the priority benefits under 35 U.S.C. §119 of Japanese Patent Applications Nos. 2011-034627 filed on Feb. 21, 2011, 2011-162415 filed on Jul. 25, 2011 and 2011-286009 filed on Dec. 27, 2011 which applications are all hereby incorporated in their entireties by reference.

BACKGROUND OF THE INVENTION

1. Field of the Invention

The presently disclosed subject matter is related to a color imaging device, and in particular, to a color imaging device that can reduce occurrence of color moire and achieve high resolution.

2. Description of the Related Art

In a single-panel type color imaging device, since a one-colored color filter is set on each pixel, each pixel has only color information of one color. Therefore, because an output image of a single-panel type color imaging device is a RAW image (mosaic image), a multi-channel image is obtained by processing to interpolate a pixel of a missing color from the surrounding pixel (synchronization processing). In this case, there is a problem of a reproduction characteristic of a high-frequency image signal. In the color imaging device, aliasing is easily generated in a captured image as compared with an imaging device for black-and-white. Therefore, there is an issue in which it is important that high-resolution is achieved by expanding a reproduction band while suppressing occurrence of color moire (false color).

In a primary color system Bayer array that is a color array of a color filter that is widely used in the single-panel type color imaging device, green (G) pixels are arranged in a checkered pattern, and red (R) pixels and blue (B) pixels are arranged line-sequentially. Therefore, there is a problem of reproduction accuracy when a high frequency signal is generated in the diagonal directions for the G signal and reproduction accuracy when a high frequency signal is generated in the horizontal and vertical directions for the R and B signals.

In a case in which a black-and-white vertical stripe pattern (high frequency image) as illustrated in (A) in FIG. 22 enters a color imaging device having a color filter of a Bayer array illustrated in (B) in FIG. 22, when the entered pattern is allocated to a Bayer color array and compared for each color, as illustrated in (C) to (E) in FIG. 22, a color image of R in light flat, a color image of B in dark flat, and a color image of G in light/dark mosaic are generated. The black-and-white image in which there is no concentration difference (level difference) between R, G, and B, originally, becomes in a state of being colored depending on a color array and an input frequency.

Similarly, in a case in which a diagonal black-and-white high frequency image as illustrated in (A) in FIG. 23 enters an imaging device including color filters of a Bayer array illustrated in (B) in FIG. 23, when the entered pattern is allocated to a Bayer color array and compared for each color, as illustrated in (C) to (E) in FIG. 23, color images of R and B in light flat and a color image of G in dark flat are generated. When it is assumed that a black value is 0 and a white value is 255, the diagonal black-and-white high frequency image becomes in green because only G becomes 255. As described above, in the Bayer array, the diagonal high frequency image cannot be reproduced appropriately.

Generally, in an imaging apparatus that uses a single-panel type color imaging device, an optical low pass filter that is constituted by a birefringence material such as crystal is arranged in the front of the color imaging device, and a high frequency is avoided so as to be optically reduced. However, in this method, coloring by the folding of the high frequency signal can be reduced, but there is a problem that the resolution is reduced due to the adverse effect.

In order to solve such a problem, a color imaging device has been proposed in which a color filter array of the color imaging device is a three-colors random array that satisfies an array restriction condition in which a given focused pixel is adjacent to any of three colors including a color of the focused pixel on the four sides of the focused pixel (Japanese Patent Application Laid-Open No. 2000-308080).

In addition, an image sensor of a color filter array has been proposed that includes a plurality of filters having different spectral sensitivities, and in which a first filter and a second filter out of the filters are alternately arranged in one diagonal direction of a pixel grid of the image sensor in a first certain cycle and are alternately arranged in the other diagonal direction in a second certain cycle (Japanese Patent Application Laid-Open No. 2005-136766).

In addition, a color array has been proposed in which, in a color solid imaging device of three primary colors of R, G, and B, appearance probabilities of R, G, and B are equalized and a given straight line (horizontal, vertical, or diagonal straight line) on an imaging surface passes through all of the colors by arranging sets of 3 pixels in which R, G, and B are horizontally arranged so that the sets are shifted in a zig-zag manner (Japanese Patent Application Laid-Open No. 11-285012).

In addition, a color imaging device has been proposed in which R and B out of three primary colors of R, G, and B are arranged in the horizontal direction and the vertical direction in every three pixels, and G is arranged between R and B (Japanese Patent Application Laid-Open No. 8-023543).

In addition, Japanese Patent Application Laid-Open No. 2009-027684 suggests a color array in which: in a color solid imaging device of three primary colors of R, G, and B, a color filter array is divided into four areas by the X axis and Y axis passing through the center; R, G, and B are arranged in a Bayer array in each area; and R, G, and B of each area has the X axis mirror symmetry pattern and the Y axis mirror symmetry pattern. In the color filter array described in this Japanese Patent Application Laid-Open No. 2009-027684, the one or more Gs are arranged on the horizontal direction (X axis) and vertical direction (Y axis) of the color filter array and each line of the diagonal directions.

SUMMARY OF THE INVENTION

The color imaging device discussed in Japanese Patent Application Laid-Open No. 2000-308080 has a random filter array. Therefore, it is necessary that optimization is performed for each random pattern when subsequent synchronization (interpolation) processing (or demosaic processing, the same applies hereinafter) is executed, so that there is a problem that the synchronization processing becomes complicated. In addition, the random array is effective in low-frequency color moire, and is not effective in a false color of a high frequency part.

In addition, in the image sensor discussed in Japanese Patent Application Laid-Open No. 2005-136766, the G pixels (brightness pixels) are arranged in the checkered pattern. Therefore, there is a problem that pixel reproduction accuracy in a limit resolution area (particularly, in the diagonal directions) is not excellent.

In the color solid imaging device discussed in Japanese Patent Application Laid-Open No. 11-285012, filters for all of the colors exist on the given straight line. Therefore, there is an advantage that occurrence of a false color can be suppressed. On the other hand, there is a problem that the high frequency reproducibility is reduced as compared with a Bayer array because ratios of the number of pixels of R, the number of pixels of G, and the number of pixels of B are equal. Note that in the case of the Bayer array, a ratio of the number of G pixels that help most to obtain a brightness signal is twice as great as each ratio of the number of R pixels and the number of B pixels.

On the other hand, in the color imaging device discussed in Japanese Patent Application Laid-Open No. 8-023543, each ratio of the number of R pixels and the number of B pixels to a ratio of the number of G pixels is higher than that of the Bayer array, and a line of only G pixels exists in the horizontal or vertical direction. Therefore, it is not effective in a false color of a high frequency part in the horizontal or vertical direction.

In the color imaging device discussed in Japanese Patent Application Laid-Open No. 2009-027684, the one or more Gs are arranged in each line of the horizontal, vertical and diagonal directions (particularly in the diagonal directions) of the color filter array. As a result, unlike the color imaging device discussed in Japanese Patent Application Laid-Open No. 2005-136766, there is no problem in the pixel reproduction accuracy in a limit resolution area (particularly in the diagonal directions). However, because either R or B is not arranged in the lines in the horizontal and vertical directions, the occurrence of the color moire (false color) cannot be suppressed.

The presently disclosed subject matter is made in view of these circumstances, and an object of the presently disclosed subject matter is to provide a color imaging device that can suppress occurrence of a false color, achieve high resolution, and simplify subsequent processing as compared with a conventional random array.

In order to attain the above object, a color imaging device according to an aspect of the presently disclosed subject matter is configured by arranging color filters of a certain color filter array on a plurality of pixels that are configured by photometric conversion elements that are arranged in a horizontal direction and a vertical direction, wherein the color filter array includes subarrays in which the color filters are arrayed in an array pattern corresponding to M×N (M is an even number equal to or greater than 2 and N is an even number equal to or greater than 4) pixels and the subarrays are repeatedly arranged in the horizontal direction and the vertical direction, the color filters include a first filter corresponding to a first color that contributes most to obtain a brightness signal and second filters corresponding to second colors of two or more colors different from the first color, and a ratio of a number of pixels of the first color corresponding to the first filter is larger than each ratio of a number of pixels of the second colors corresponding to the second filters, the first filter is arranged in a checkered pattern in the subarrays such that an arrangement of the first filter in one of the subarrays that are adjacent to each other in the horizontal direction or the vertical direction and an arrangement of the first filter in another have a mirror image relationship, and one or more of the second filters corresponding to each color of the second colors are arranged in each line in the horizontal direction and the vertical direction of the color filter array in a basic array pattern which is repeatedly arranged in the horizontal direction and the vertical direction in the color filter array and which includes K (K is a natural number equal to or greater than 1) sets of the subarrays that are adjacent to each other and have a mirror image relationship in the arrangement of the first filter.

According to an aspect of the presently disclosed subject matter, the first filters that contribute most to obtain a brightness signal is arranged in a checkered pattern in subarrays such that the arrangements of the first filters have a mirror image relationship between subarrays that are adjacent to each other in the horizontal direction or the vertical direction. Therefore, it is possible to arrange one or more first filters in each line in the horizontal, vertical, upper right diagonal and lower right diagonal directions of the color filter array and improve the reproduction accuracy of synchronization processing in a high frequency area.

In addition, one or more second filters corresponding to each color of the second colors of two or more colors different from the first color are arranged in each line in the horizontal direction and the vertical direction of the color filter array in the basic array pattern. Therefore, it is possible to suppress occurrence of color moire (false color) and achieve high resolution.

Moreover, a certain basic array pattern is repeatedly arranged in horizontal direction and the vertical direction in the color filter array. Therefore, according to the above aspect, at the time of performing subsequent synchronization (interpolation) processing, it is possible to perform processing according to a repetitive pattern. In addition, according to the above aspect, it is possible to simplify subsequent processing as compared with a conventional random array.

Moreover, in the above aspect, the ratio of the number of pixels of the first color corresponding to the first color and the ratio of the number of pixels of each color of the second colors of two or more colors corresponding to the second filter are made different from each other, and the ratio of the number of pixels of the first color that contributes most to obtain a brightness signal especially is made larger than the ratio of the number of pixels of each color of the second colors corresponding to the second filter. Therefore, it is possible to suppress aliasing and provide high frequency reproduction accuracy.

In addition, in the above aspect, the basic array pattern is formed with an array pattern corresponding to αM×βN (both α and β are natural numbers equal to or greater than 1) pixels. Therefore, for example, in a case where the color imaging device is a CMOS (Complementary Metal Oxide Semiconductor) imaging device, one amplifier circuit can be shared with the even number (for example, 4) of pixels.

In the color imaging device according to another aspect of the presently disclosed subject matter, the basic array pattern is formed with one set. This is because a special effect cannot be obtained by enlarging the size of the basic array pattern while signal processing such as synchronization becomes complicated in a case where the basic array pattern is enlarged.

In the color imaging device according to another aspect of the presently disclosed subject matter, the basic array pattern is an array pattern corresponding to 4×4 pixels in a case where M×N is 2×4. This is because it is not possible to arrange one or more second filters of colors in each line in the horizontal direction and the vertical direction of the color filter in the basic array pattern in a case where the basic array pattern is an array pattern corresponding to 2×8 pixels.

In the color imaging device according to another aspect of the presently disclosed subject matter, the basic array pattern is formed with four of the subarrays which are adjacent to each other in the horizontal direction and the vertical direction and which have a mirror image relationship in the arrangement of the first filter between the adjacent subarrays in a case where M and N are different each other. By this means, the color filter array includes a square array corresponding to 2×2 pixels formed with the first filter. It is possible to determine the direction with high correlation among the horizontal, vertical, upper right diagonal and lower right diagonal directions by using this pixel values of 2×2 pixels.

In the color imaging device according to yet another aspect of the presently disclosed subject matter, it is preferable that M and N are even numbers equal to or less than 10. This is because a special effect cannot be obtained by enlarging the size of the basic array pattern while signal processing such as synchronization becomes complicated in a case where M and N exceed 10 (M, N>10).

In the color imaging device according to yet another aspect of the presently disclosed subject matter, it is preferable that the first color is a green (G) color and the second colors are a red (R) color and a blue (B) color.

According to the presently disclosed subject matter, one or more first filters corresponding to the first color that contributes most to obtain a brightness signal is arranged in each line in the horizontal, vertical, upper right diagonal and lower right diagonal directions of the color filter array, and the ratio of the number of pixels of the first color corresponding to the first filter is made larger than the ratio of the number of pixels of each color of the second colors corresponding to the second filter of two or more colors different from the first color. Therefore, it is possible to improve the reproduction accuracy of synchronization (interpolation) processing in the high frequency area and suppress aliasing.

Moreover, one or more second filters corresponding to each color of the second colors of two or more colors different from the first color are arranged in each line in the horizontal and vertical directions of the color filter array in a basic array pattern. Therefore, it is possible to suppress the occurrence of the color moire (false color) and achieve high resolution.

In addition, a certain basic array pattern is repeated in the horizontal direction and vertical direction in the color filter array according to the presently disclosed subject matter. Therefore, when subsequent synchronization (interpolation) processing is performed, it is possible to perform processing according to the repetition pattern and simplify the subsequent processing as compared with a conventional random array.

DETAILED DESCRIPTION OF EXEMPLARY EMBODIMENTS

Embodiments of the presently disclosed subject matter are described below in detail with reference to the accompanying drawings.

{Entire Configuration of Color Imaging Device}

Figure 1:
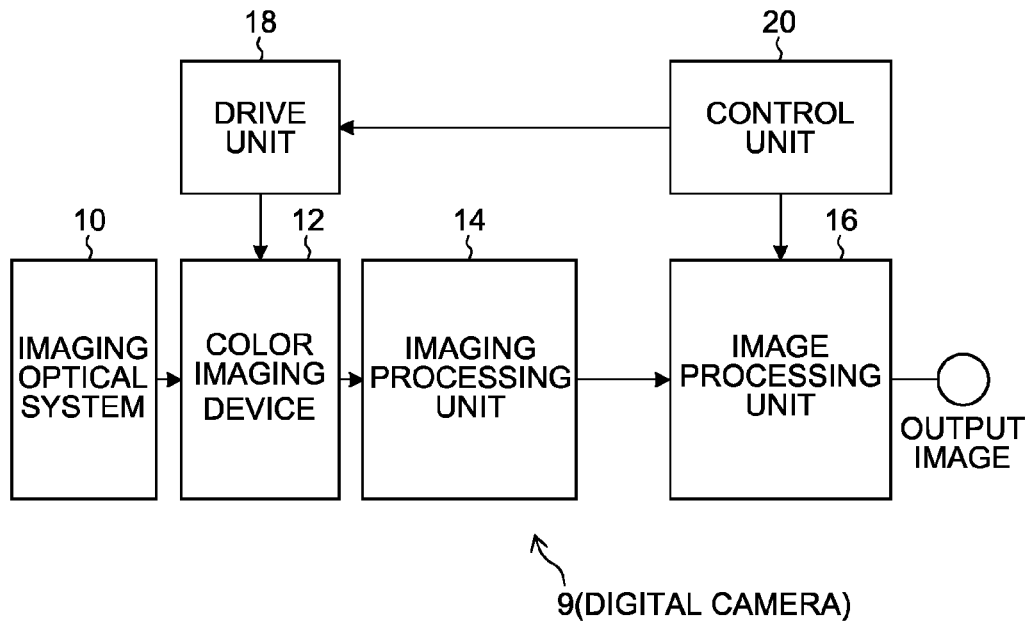
FIG. 1 is a block diagram illustrating a digital camera including a single-panel type color imaging device according to the presently disclosed subject matter.

FIG. 1 is a block diagram illustrating a digital camera 9 including a color imaging device according to the presently disclosed subject matter. The digital camera 9 includes an imaging optical system 10, a color imaging device 12, an imaging processing unit 14, an image processing unit 16, a drive unit 18 and a control unit 20.

An object is imaged by the imaging optical system 10 and an optical image indicating the object image is formed on the light receiving surface of the color imaging device 12 (color imaging device of the first embodiment).

The color imaging device 12 is so-called a single-panel type color imaging device that includes: a plurality of pixels formed with photoelectric conversion elements arrayed (two dimensional array) in the horizontal direction and vertical direction in the figure on the imaging surface; and a color filter of a certain color filter array arranged above the light receiving surface of each pixel. Here, "above" indicates the direction of the side through which the object light enters into the imaging surface of the color imaging device 12.

The object image formed in the color imaging device 12 is converted into a signal electric charge corresponding to the incident ray volume by the photoelectric conversion element of each pixel. The signal electric charge accumulated in each photoelectric conversion element is sequentially read from the color imaging device 12 as a voltage signal (image signal) corresponding to the signal electric charge, on the basis of a drive pulse given from the drive unit 18 according to an instruction of the control unit 20. The image signals read from the color imaging device 12 are R, G and B signals indicating mosaic images of red (R), green (G) and blue (B) corresponding to the color filter array of the color imaging device 12.

The image signals read from the color imaging device 12 are input in the imaging processing unit 14. The imaging processing unit 14 includes a Correlation Double Sampling circuit (CDS) to remove the reset noise included in the image signals, an AGC (Automatic Gain Control) circuit to amplify the image signals and control them to a certain level, and an A/D converter. This imaging processing unit 14 amplifies the input image signals by the correlation double sampling processing and subsequently outputs RAW data formed with converted digital image signals to the image processing unit 16.

The image processing unit 16 includes a white balance correction circuit, a gamma-correction circuit, a synchronization processing circuit (a processing circuit that calculates all color information of RGB for each pixel from the mosaic images of RGB according to the color filter array of the single-panel type color imaging device 12 (i.e. converts it in a simultaneous manner)), a brightness/color-difference signal generation circuit, an outline correction circuit and a color correction circuit. The image processing unit 16 performs necessary signal processing on the RAW data of the mosaic image input from the imaging processing unit 14 according to the instruction from the control unit 20 and generates image data (YUV data) including brightness data (Y data) and color difference data (Cr and Cb data).

The image data generated in the image processing unit 16 is subjected to compression processing compatible with the JPEG (Joint Photographic Experts Group) standard in the case of still images by a compression/decompression processing circuit, and the image data generated in the image processing unit 16 is subjected to compression processing compatible with the MPEG2 (Moving Picture Experts Group) standard in the case of moving images and subsequently recorded in non-illustrated recording media (for example, memory card). Moreover, the above image data is output to a display unit (not illustrated) such as a liquid crystal monitor and displayed.

{First Embodiment of Color Imaging Device}

Figure 2:
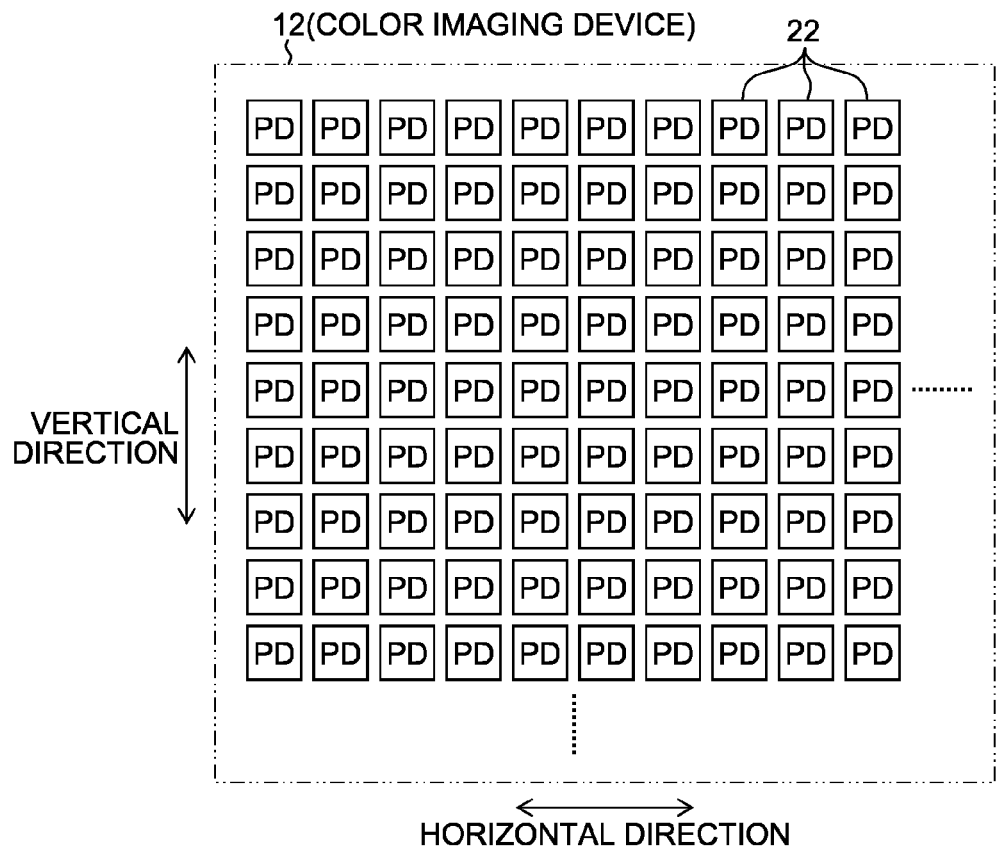
FIG. 2 is a diagram illustrating pixels of the single-panel type color imaging device according to the presently disclosed subject matter.
Figure 3:
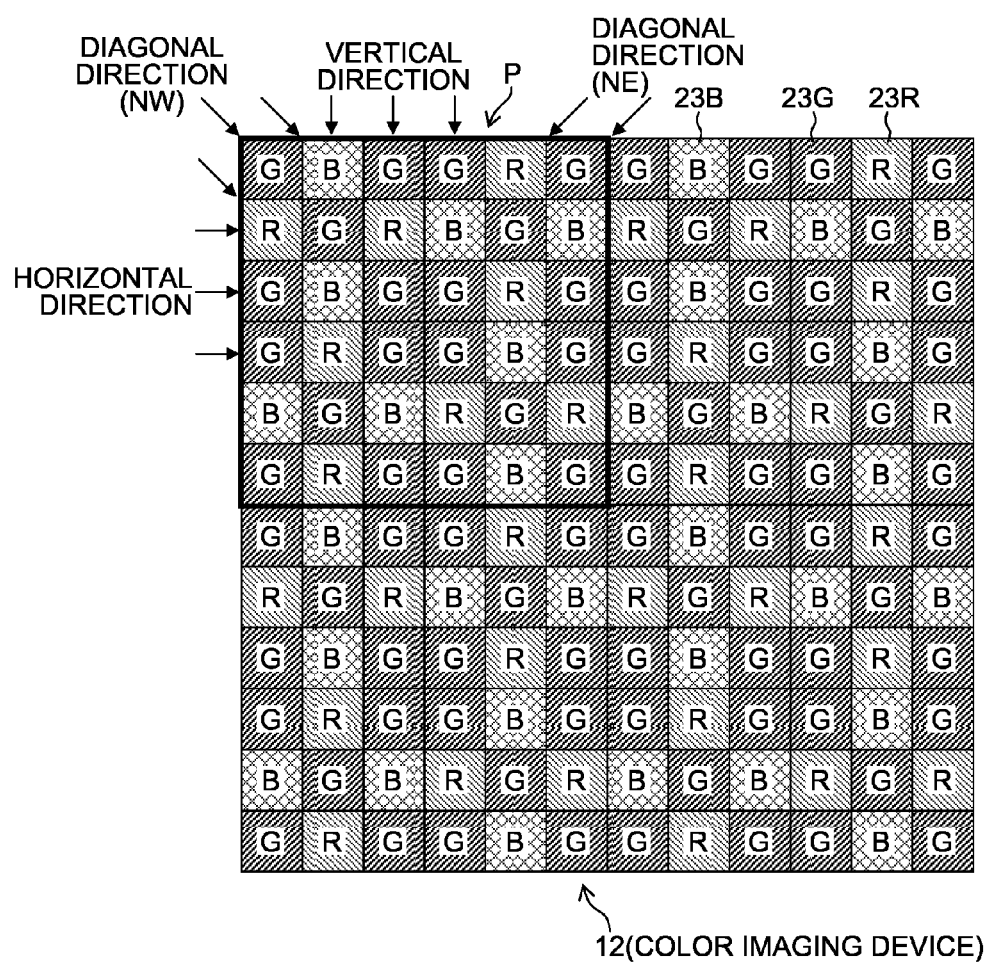
FIG. 3 is a diagram illustrating the first embodiment of the single-panel type color imaging device according to the presently disclosed subject matter.

FIGS. 2 and 3 are diagrams illustrating the first embodiment of the single-panel type color imaging device according to the presently disclosed subject matter. FIG. 2 illustrates the pixel array of pixels provided in the color imaging device 12, and FIG. 3 illustrates the color filter array of a color filter.

As illustrated in FIG. 2, the color imaging device 12 includes a plurality of pixels that include photoelectric conversion elements 22 that are arrayed (two dimensional array) in the horizontal direction and the vertical direction and a color filter of the color filter array illustrated in FIG. 3, which is arranged above the light receiving surface of each pixel. One of color filters of three primary colors of RGB (hereinafter referred to as "R filter," "G filter" and "B filter," respectively) 23R, 23G and 23B is arranged in each pixel. In the following, a pixel in which R filter 23R is arranged is referred to as "R pixel," a pixel in which G filter 23G is arranged is referred to as "G pixel" and a pixel in which B filter 23B is arranged is referred to as "B pixel."

Note that the color imaging device 12 is not limited to a CCD (Charge Coupled Device) color imaging device, and may be another type of imaging device such as a CMOS (Complementary Metal Oxide Semiconductor) imaging device.

<Features of the Color Filter Array>

The color filter array of the color imaging device 12 of the first embodiment includes the following features (1), (2), (3), (4), (5), and (6).

(Feature (1))

The color filter array illustrated in FIG. 3 includes a basic array pattern P (pattern indicated by the thick frame in the figure) that includes a square array pattern that corresponds to 6×6 pixels, and in the color filter array, the basic array pattern P is repeatedly arranged in the horizontal direction and the vertical direction. That is, in the color filter array, the R filter 23R, the G filter 23G, and the B filter 23B of the colors of R, G, and B are arranged with a certain cyclic nature.

Synchronization (interpolation) processing etc. for R, G, and B signals that are read out from the color imaging device 12 can be executed in accordance with the repeat pattern because the R filter 23R, the G filter 23G, and the B filter 23B are arranged with the certain cyclic nature as described above.

In addition, when an image is reduced by executing down-sampling processing in unit of the basic array pattern P, a color filter array after the down-sampling processing was executed can be the same as the color filter array before the down-sampling processing, so that a common processing circuit can be used.

(Feature (2))

In the color filter array illustrated in FIG. 3, G filters 23G that correspond to a color that contributes most to obtain a brightness signal (color of G in the embodiment) are arranged in each line of the horizontal, vertical, and diagonal (NE and NW) direction of the color filter array. Here, NE indicates the upper right diagonal direction, and NW indicates the lower right diagonal direction. For example, in a case of a square pixel array, the upper right diagonal and lower right diagonal directions are directions of 45° with respect to the horizontal direction. On the other hand, in a case of a rectangle pixel array, the upper right diagonal and lower right diagonal directions are directions of diagonal lines of the rectangle, and the angles vary depending on the lengths of long side and short side.

The one or more G filters 23G that correspond to the brightness system pixel are arranged in each line of the horizontal, vertical, and diagonal (NE and NW) directions of the color filter array. Therefore, the reproduction accuracy of the synchronization processing in a high frequency area can be improved regardless of a direction having a high frequency.

(Feature (3))

In the basic array pattern P of the color filter array illustrated in FIG. 3, the number of pixels of the R pixel, the G pixel, and the B pixel that correspond to the R filter 23R, the G filter 23G, and the B filter 23B are 8 pixels, 20 pixels, 8 pixels, respectively. That is, a proportion of the number of pixels of the R pixel, the G pixel, and the B pixel is 2:5:2, and a ratio of the number of G pixels that contribute most to obtain a brightness signal is greater than each ratio of the number of R pixels or the number of B pixels.

As described above, the ratio of the number of G pixels is different from the each of the ratios of the number of R pixels and the number of B pixels, and in particular, the ratio of the number of G pixels that help most to obtain a brightness signal is greater than each of the ratios of the number of R pixels and the number of B pixels. Therefore, aliasing at the time of the synchronization processing can be suppressed, and the high frequency reproducibility can be also improved.

(Feature (4))

In the color filter array illustrated in FIG. 3, the one or more R filters 23R and the one or more B filters 23B that are correspond to the other two or more colors (colors of R and B in the embodiment) other than the above-described color of G are arranged respectively in each line of the horizontal and vertical directions of the color filter array in the basic array pattern P.

Because R filter 23R and B filter 23B are arranged in each line of the horizontal and vertical directions of the color filter array, it is possible to suppress the occurrence of color moire (false color). By this means, an optical low pass filter to suppress the occurrence of the false color may not to be arranged in an optical path that extends from an incidence surface of an optical system to an imaging surface. Moreover, even in a case in which an optical low pass filter is employed, the optical low pass filter having a weak effect to cut a high frequency component to inhibit the occurrence of the false color can be employed. By this means, the resolution is able not to be impaired by the optical low pass filter.

Figure 4:
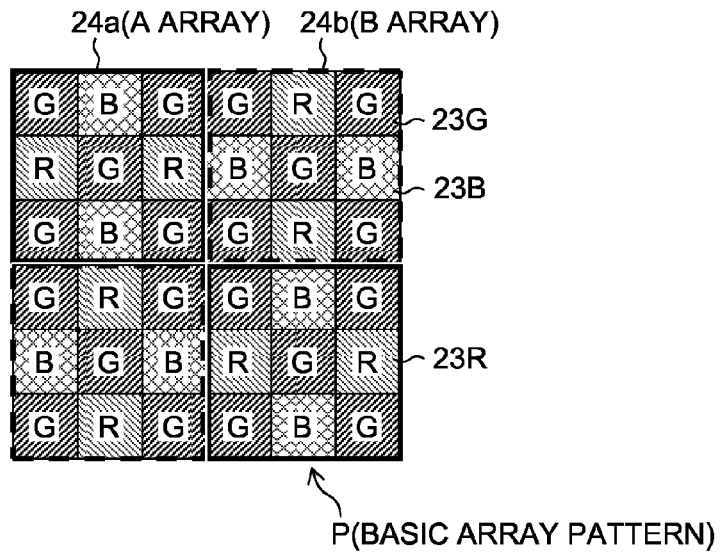
FIG. 4 is a diagram illustrating a basic array pattern included in a color filter array of the color imaging device of the first embodiment.

FIG. 4 illustrates a state where basic array pattern P illustrated in FIG. 3 is divided into four parts of 3×3 pixels.

As illustrated in FIG. 4, it can be understood that the basic array pattern P includes an array in which an A array 24a of 3×3 pixels that are enclosed by the frame of solid line in the figure and a B array 24b of 3×3 pixels that are enclosed by the frame of broken line in the figure are alternately arranged in the horizontal direction and the vertical direction.

In each of the A array 24a and the B array 24b, the G filters 23G that are brightness system pixels are arranged at the four corners and the center, and are arranged on the both diagonal lines. In addition, in the A array 24a, the R filters 23R are arranged in the horizontal direction and the B filters 23B are arranged in the vertical direction while sandwiching the G filter 23G that is arranged at the center. On the other hand, in the B array 24b, the B filters 23B are arranged in the horizontal direction and the R filters 23R are arranged in the vertical direction while sandwiching the G filter 23G that is arranged at the center. That is, in the A array 24a and the B array 24b, positional relationship of the R filter 23R and the B filter 23B is reversed, however, the other arrangements are same.

Figure 5:
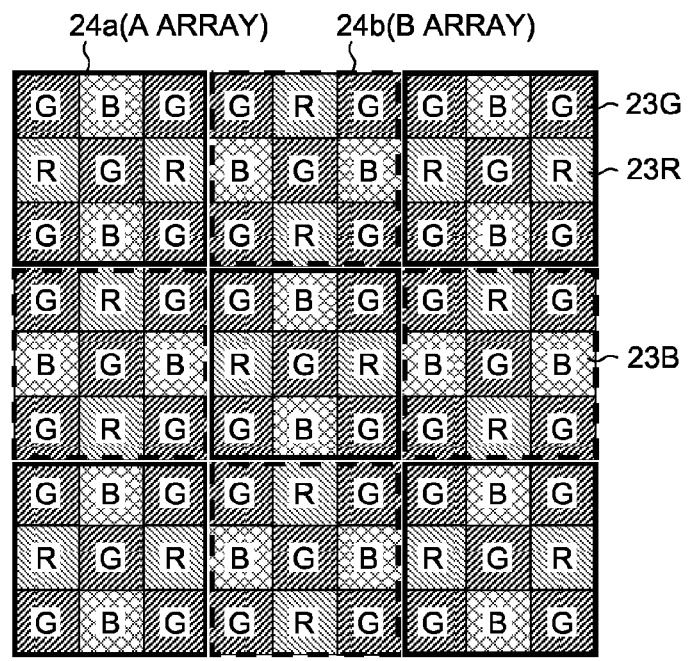
FIG. 5 is a diagram illustrating a state in which a basic array pattern of 6×6 pixels that is included in a color filter array of the color imaging device of the first embodiment is divided into A arrays of 3×3 pixels and B arrays of 3×3, and the arrays are arranged.

In addition, as illustrated in FIG. 5, the G filters 23G that are arranged at the four corners of the A array 24a and the B array 24b correspond to a G filter 23G of a square array of 2×2 pixels by alternately arranging the A array and the B array in the horizontal and vertical directions.

This is why the G filter 23G of the square array that corresponds to 2×2 pixels is formed by arranging the G filters 23G that are brightness system pixels at the four corners and the center in the 3×3 pixels of the A array 24a or the B array 24b, and alternately arranging the 3×3 pixels in the horizontal and vertical directions. Note that, by such an array, the above-described features (1), (2), and (3), and the following feature (5) are satisfied.

(Feature (5))

The color filter array illustrated in FIG. 3 includes square array 25 (hereinafter simply referred to as "G square array 25," see FIG. 6) corresponding to 2×2 pixels in which G filter 23G is set.

Figure 6:
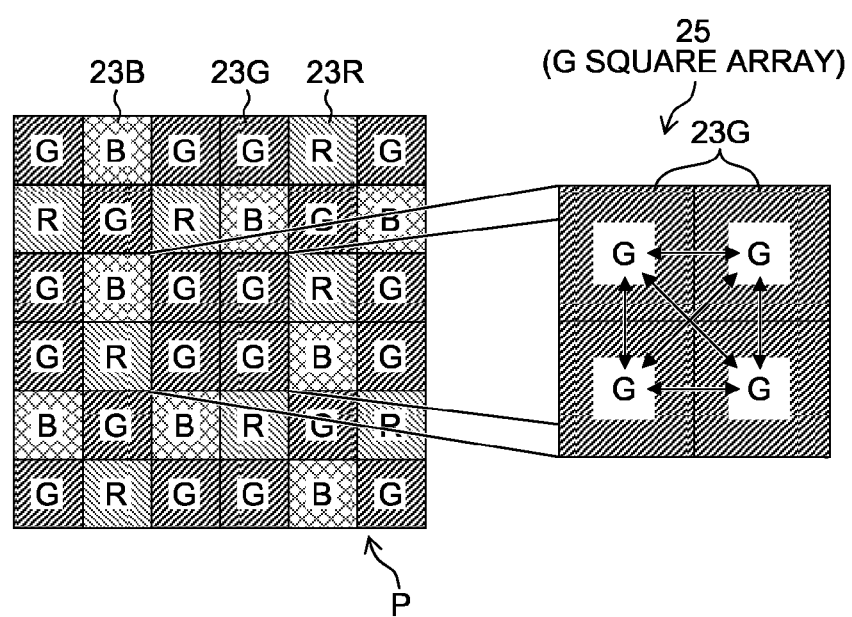
FIG. 6 is a diagram that is used to explain a method of determining a correlation direction from pixel values of the G pixels of 2×2 pixels that are included in the color filter array of the color imaging device of the first embodiment.

As illustrated in FIG. 6, 2×2 pixels forming G square array 25 are extracted to calculate the difference absolute value of the pixel values of G pixels in the horizontal direction, the difference absolute value of the pixel values of G pixels in the vertical direction and the difference absolute values of the pixel values of G pixels in the diagonal directions (upper right diagonal and upper left diagonal). By this means, it is possible to determine that there is a correlation in the direction in which the difference absolute value is small among the horizontal direction, the vertical direction and diagonal directions.

That is, according to this color filter array, it is possible to determine the direction with a high correlation among the horizontal direction, the vertical direction and the diagonal directions, by the use of information on G pixels of the minimum pixel interval. This direction determination result can be used for processing (synchronization processing) to interpolate surrounding pixels first. By this means, it is possible to perform synchronization processing by the image processing unit 16.

In addition, as illustrated in FIG. 5, when pixels in the A array 24a or the B array 24b of 3×3 pixels are set as target pixels of the synchronization processing, and 5×5 pixels (local area of the mosaic image) are extracted using the center pixel of the A array 24a or the B array 24b as the center, G pixels of 2×2 pixels exist at each of the four corners of 5×5 pixels. By using pixel values of the G pixels of 2×2 pixels, determination of a correlation direction in the four directions can be accurately performed by using the information of G pixels of the minimum pixel distance.

(Feature (6))

Basic array pattern P of the color filter array illustrated in FIG. 3 is point symmetrical with respect to the center (center of four G filters 23G). In addition, as illustrated in FIG. 4, A array and B array in basic array pattern P are also point symmetrical with respect to center G filter 23G, respectively.

By such symmetry, the circuit size of a processing circuit that is provided downstream can be reduced and simplified.

Figure 7:
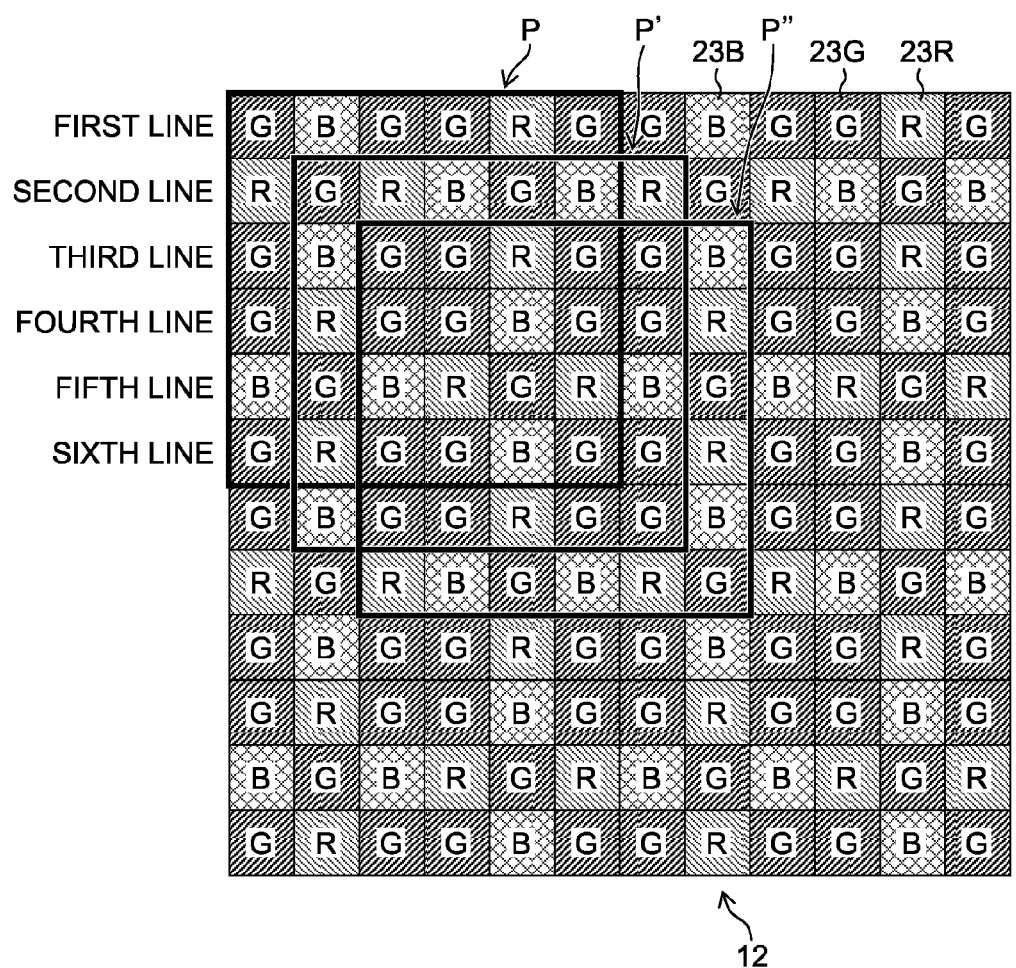
FIG. 7 is a diagram that is used to explain a concept of a basic array pattern included in the color filter array of the color imaging device.

As illustrated in FIG. 7, in the basic array pattern P that is indicated by the thick frame, color filter arrays of the first and third lines out of the first to sixth lines in the horizontal direction are G B G G R G, a color filter array of the second line is R G R B G B, color filter arrays of the fourth and sixth lines are G R G G B G, and a color filter array of the fifth line is B G B R G R.

Here, in FIG. 7, in a case in which a basic array pattern that is obtained by shifting the basic array pattern P by one pixel in the horizontal direction and the vertical direction is set as a basic array pattern P', and a basic array pattern that is obtained by shifting the basic array pattern P by two pixels in the horizontal direction and the vertical direction is set as a basic array pattern P''', the same color filter array is obtained even when the basic array patterns P'' and P''' are repeatedly arranged in the horizontal direction and the vertical direction.

That is, there is a plurality of basic array patterns that can constitute the color filter array illustrated in FIG. 7 by repeatedly arranging the basic array pattern in the horizontal direction and the vertical direction. In the first embodiment, for convenience, the basic array pattern P in which the basic array pattern is point symmetrical is referred to as a basic array pattern.

Note that, in a color filter array according to the other embodiments that are described below, there is a plurality of basic array patterns for each color filter array, however the typical pattern is referred to as a basic array pattern of the color filter array.

{Second Embodiment of Color Imaging Device}

Figure 8:
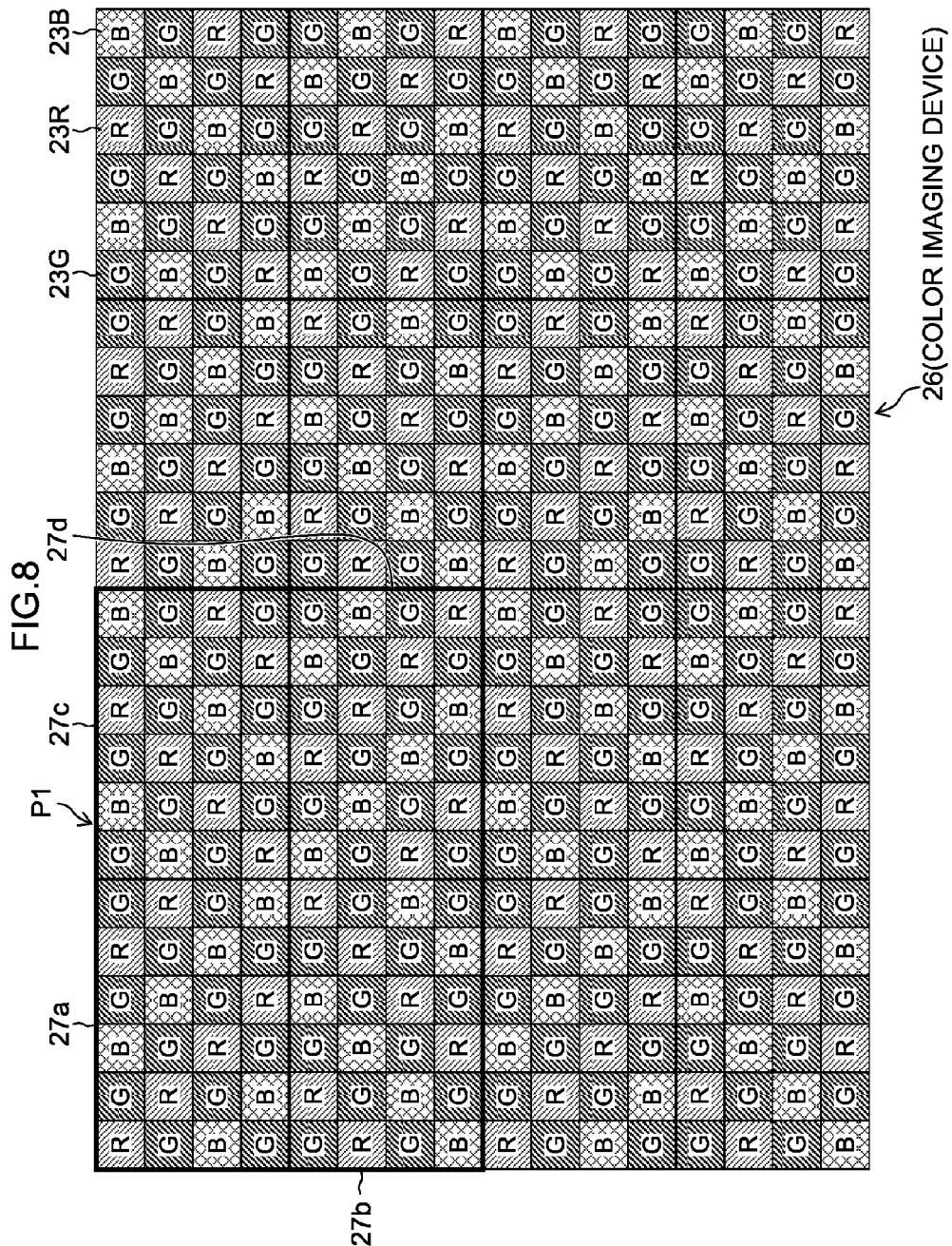
FIG. 8 is a diagram illustrating a second embodiment of the single-panel type color imaging device according to the presently disclosed subject matter.

FIG. 8 is a diagram illustrating the second embodiment of the single-panel type color imaging device according to the presently disclosed subject matter and, particularly, illustrates the color filter array of the color imaging device. Here, the color imaging device of the second embodiment adopts basically the same configuration as the above first embodiment, except for a point that the color filter array is different. Therefore, the same reference characters are assigned to the same functions and configurations as in the above first embodiment and their explanation is omitted.

The color filter array of a color imaging device 26 of the second embodiment (hereinafter simply referred to as "color filter array") includes basic array pattern P1 in which RGB filters 23R, 23G, and 23B are arrayed in an array pattern corresponding to 8×12 pixels, and this basic array pattern P1 is repeatedly arranged in the horizontal direction and the vertical direction. Therefore, the color filter array has the above feature (1).

Figure 9:
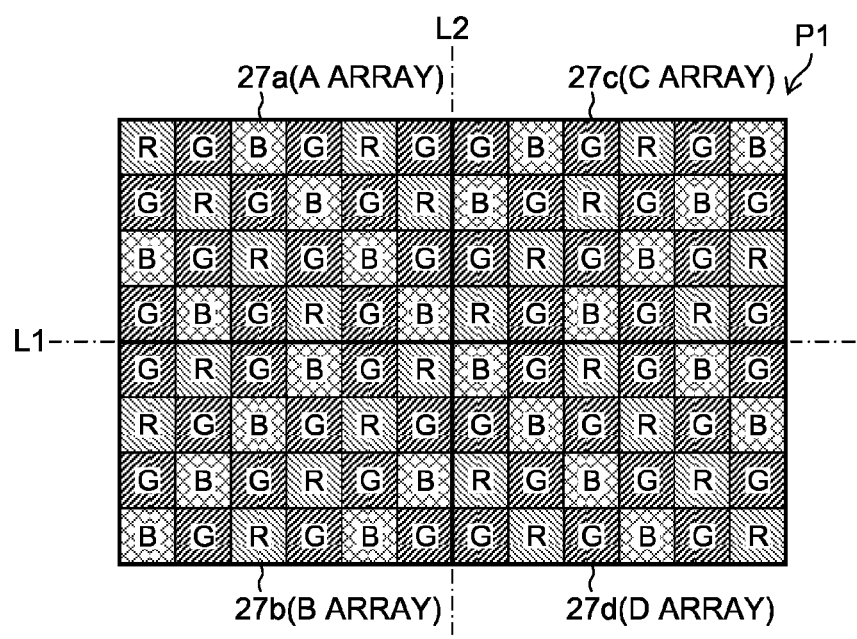
FIG. 9 is a diagram illustrating a basic array pattern included in the color filter array of the color imaging device of the second embodiment.

As illustrated in FIG. 9, basic array pattern P1 is formed with four kinds of subarrays having an array pattern corresponding to 4×6 pixels. These four kinds of subarrays are A array 27a, B array 27b, C array 27c and D array 27d. Arrays 27a to 27d are arranged in a matrix manner so as to be mutually adjacent in the horizontal and vertical directions.

To be more specific, A array 27a and B array 27b are adjacent in the vertical direction and C array 27c and D array 27d are adjacent in the vertical direction. Moreover, A array 27a and C array 27c are adjacent in the horizontal direction and B array 27b and D array 27d are adjacent in the horizontal direction. Here, reference character L1 in figure designates the borderlines between A array 27a and C array 27c and between B array 27b and D array 27d. Moreover, reference character L2 designates the borderlines between A array 27a and B array 27b and between C array 27c and D array 27d.

In each of arrays 27a to 27d, G filters 23G are arranged in a checkered pattern (or checker pattern). At this time, G filters 23G are arranged such that the arrangement of G filters 23G has a mirror image relationship between adjacent arrays 27a to 27d. To be more specific, the arrangement of G filters 23G in A array 27a and the arrangement of G filters 23G in B array 27b have the mirror image relationship with respect to borderline L1. Moreover, the arrangement of G filters 23G in C array 27c and the arrangement of G filters 23G in D array 27d have the mirror image relationship with respect to borderline L1 too.

In addition, the arrangement of G filters 23G in A array 27a and the arrangement of G filters 23G in C array 27c have the mirror image relationship with respect to borderline L2. Moreover, the arrangement of G filters 23G in B array 27b and the arrangement of G filters 23G in D array 27d have the mirror image relationship with respect to borderline L2 too.

Therefore, basic array pattern P1 includes two sets of subarrays [(a set of A array 27a and B array 27b and a set of C array 27c and D array 27d) or (a set of A array 27a and C array 27c and a set of B array 27b and D array 27d)] which are adjacent to each other and in which the arrangement of G filters 23G have a mirror image relationship.

Thus, in a case where each of arrays 27a to 27d has an arrangement pattern corresponding to M×N (M<N and both are even numbers) pixels (condition 1), G filters 23G are arranged in a checkered pattern in each of arrays 27a to 27d (condition 2) and the arrangement of G filters 23G in each of arrays 27a to 27d adjacent to each other in the horizontal/vertical direction has a mirror image relationship (condition 3), G filters 23G are arranged in each line in the horizontal, vertical and diagonal directions (NE, NW) of the color filter array.

Figure 10:
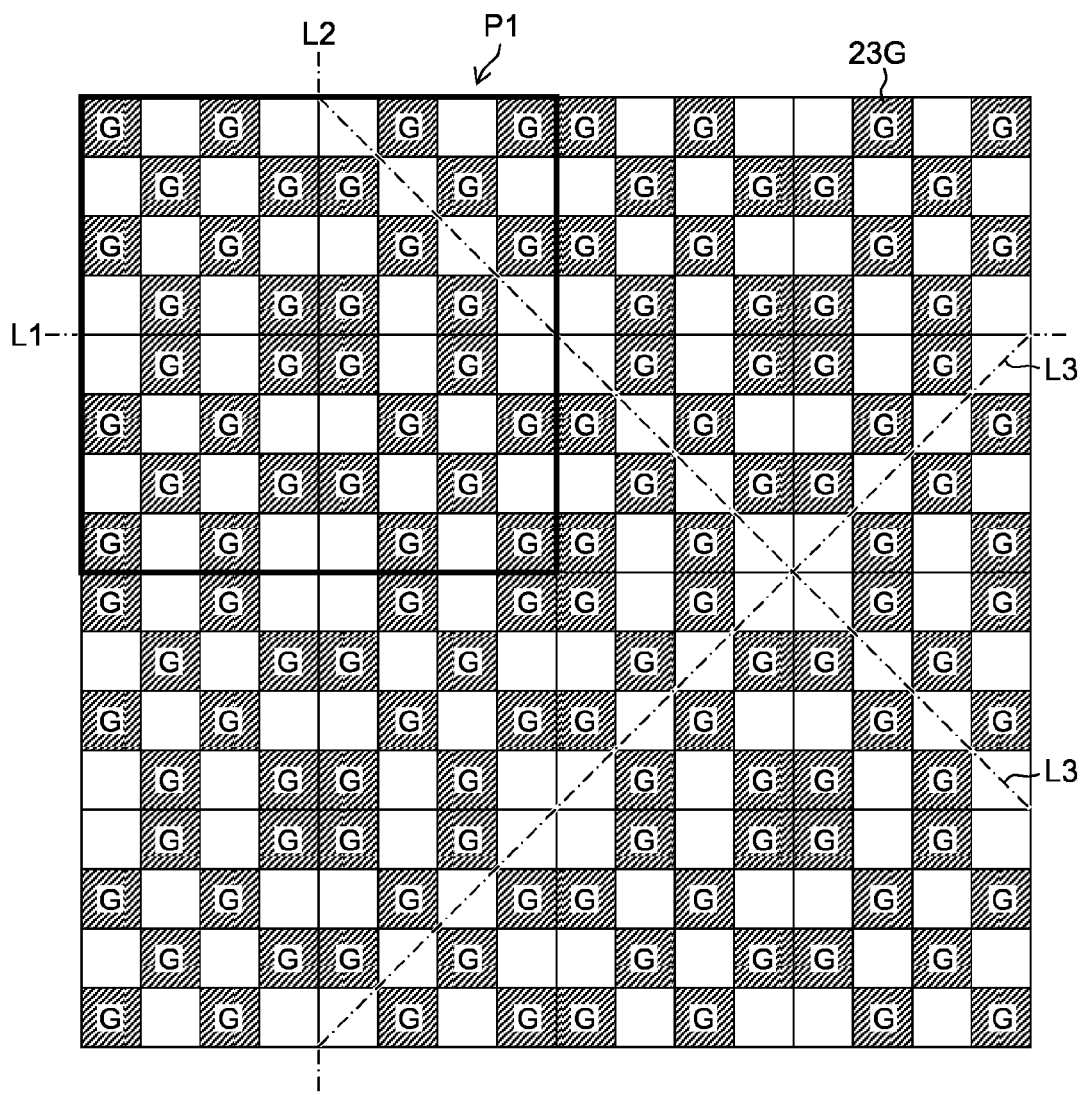
FIG. 10 is a diagram illustrating the color filter array of a comparative example having a square array pattern.

Meanwhile, for example, like the comparative example illustrated in FIG. 10, in a case where condition 2 and condition 3 are satisfied and condition 1 is not satisfied, specifically, in a case where each of arrays 27a to 27d is a square array pattern corresponding to N×M (N=M) pixels, diagonal (NE, NW) lines are generated in which G filter 23G is not arranged. This is because one of diagonals of each of arrays 27a to 27d is G blank diagonal L3 passing through a pixel in which G filter 23G is not arranged (hereinafter referred to as "G blank pixel"), this G blank diagonal L3 passes through an intersection of borderline L1 and borderline L2 and thereby G blank diagonal L3 of each of arrays 27a to 27d is located on the same straight line.

Figure 11:
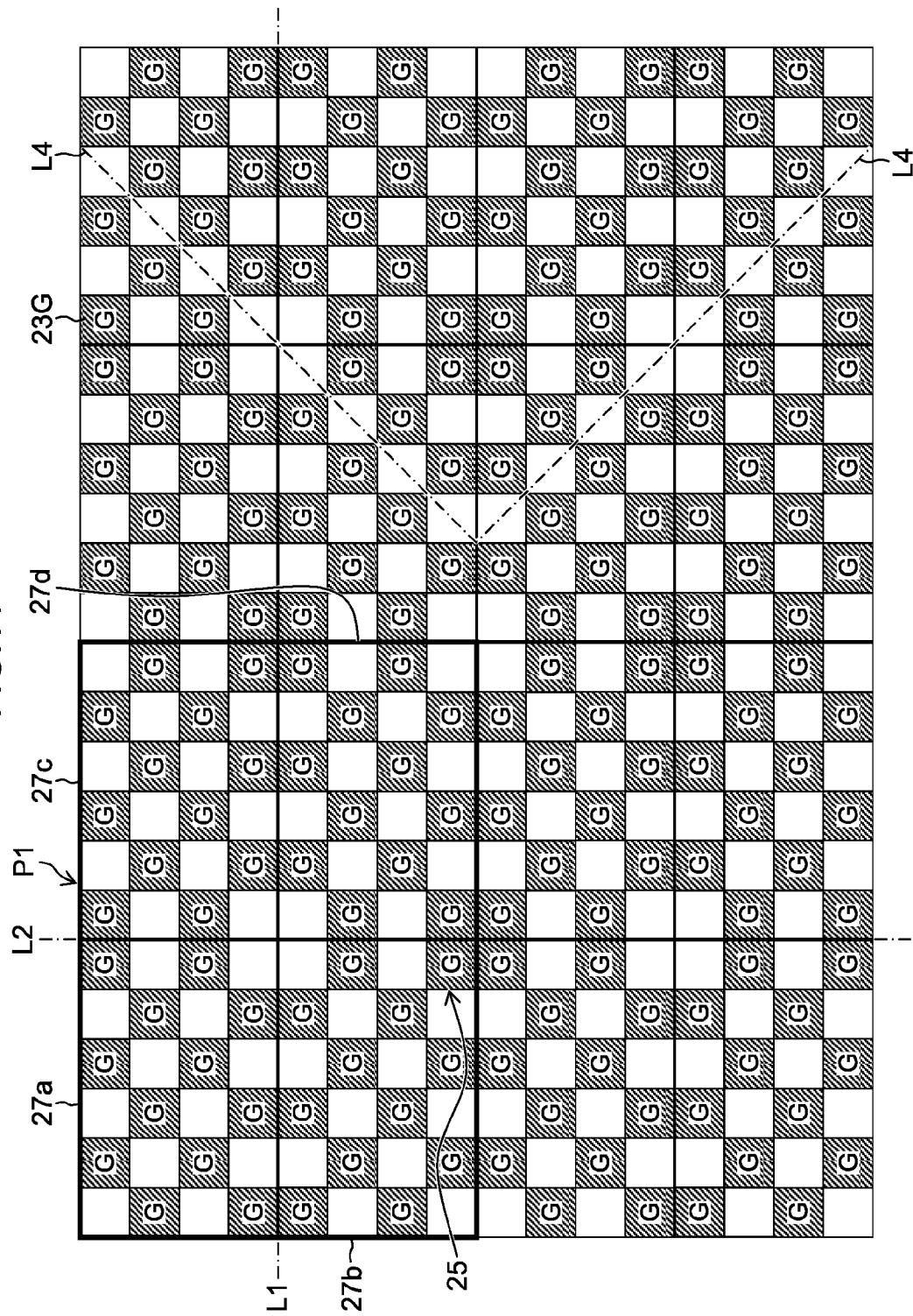
FIG. 11 is a diagram that is used to explain that lines in the upper right diagonal and lower right diagonal directions {diagonal (NE, NW) directions} in which the G filter is not arranged are not generated in the color filter array of the color imaging device of the second embodiment.

By contrast with this, by satisfying the above conditions 1 to 3 in the present embodiment, as illustrated in FIG. 11, G blank line L4 passing through a G blank pixel arranged in the diagonals (NE, NW) in each of arrays 27a to 27d does not pass through both two corners (intersection of borderline L1 and borderline L2) at the opposite-angle position of each of arrays 27a to 27d. As a result, like the comparative example illustrated in FIG. 10, G blank line L4 of each of arrays 27a to 27d is not located on the same straight line and the diagonal (NE, NW) lines are not generated in which G filter 23G is not arranged.

Moreover, because G filters 23G in each of arrays 27a to 27d are randomly arrayed in a case where condition 2 is not satisfied, G filters 23G are not arranged in each line in the horizontal, vertical and diagonal (NE, NW) directions of the color filter array. In addition, because the color filter array in which G filters 23G are uniformly arranged in a checkered pattern in a case where condition 3 is not satisfied, the diagonal (NE, NW) lines are generated in which G filter 23G is not arranged.

In view of the above reasons, according to the second embodiment, by arraying G filters 23G so as to satisfy above conditions 1 to 3, G filters 23G are arranged in each line in the horizontal, vertical and diagonal (NE, NW) directions of the color filter array. By this means, the color filter array has the above feature (2). Also, another embodiment is described later in which the color filter array has feature (2) even in a case where condition 3 is changed or condition 1 and condition 3 are changed.

Moreover, in a case where above conditions 1-3 are satisfied, the arrangement of G filters 23G in A array 27a and the arrangement of G filters 23G in D array 27d are point symmetrical with respect to the center of basic array pattern P1. Similarly, the arrangement of G filters 23G in B array 27b and the arrangement of G filters 23G in C array 27c are point symmetrical with respect to the center of basic array pattern P1, too. In addition, in a case where above conditions 1 to 3 are satisfied, the color filter array includes G square array 25. By this means, the color filter array has above feature (5).

Returning to FIG. 8 and FIG. 9, R filter 23R and B filter 23B are arranged in each line in the horizontal and vertical directions of the color filter array in basic array pattern P1 as well as the first embodiment. Therefore, the color filter array has above feature (4).

Moreover, in the second embodiment, R filter 23R and B filter 23B are also arranged such that A array 27a and D array 27d are point symmetrical with respect to the center of basic array pattern P1 and B array 27b and C array 27c are point symmetrical with respect to the center of basic array pattern P1. By this means, the color filter array has above feature (6).

In addition, in the second embodiment, the number of pixels of R pixels, G pixels and B pixels respectively corresponding to RGB filters 23R, 23B and 23R in basic array pattern P1 (hereinafter abbreviated to "each number of pixels of RGB pixels" appropriately) are 24 pixels, 48 pixels and 24 pixels. Therefore, because the ratio of each number of pixels of RGB pixels is 1:2:1, the color filter array has above feature (3).

As described above, the color filter array of the second embodiment has the same features as feature (1) to feature (6) of the color filter array of the first embodiment.

Moreover, basic array pattern P1 is formed with an array pattern corresponding to "even number×even number" pixels. Therefore, in a case where the color imaging device 26 is a CMOS imaging device, for example, it is possible to share one amplifier circuit with four pixels arranged in a square matrix (the same applies to other embodiments).

{Third Embodiment of Color Imaging Device}

Figure 12:
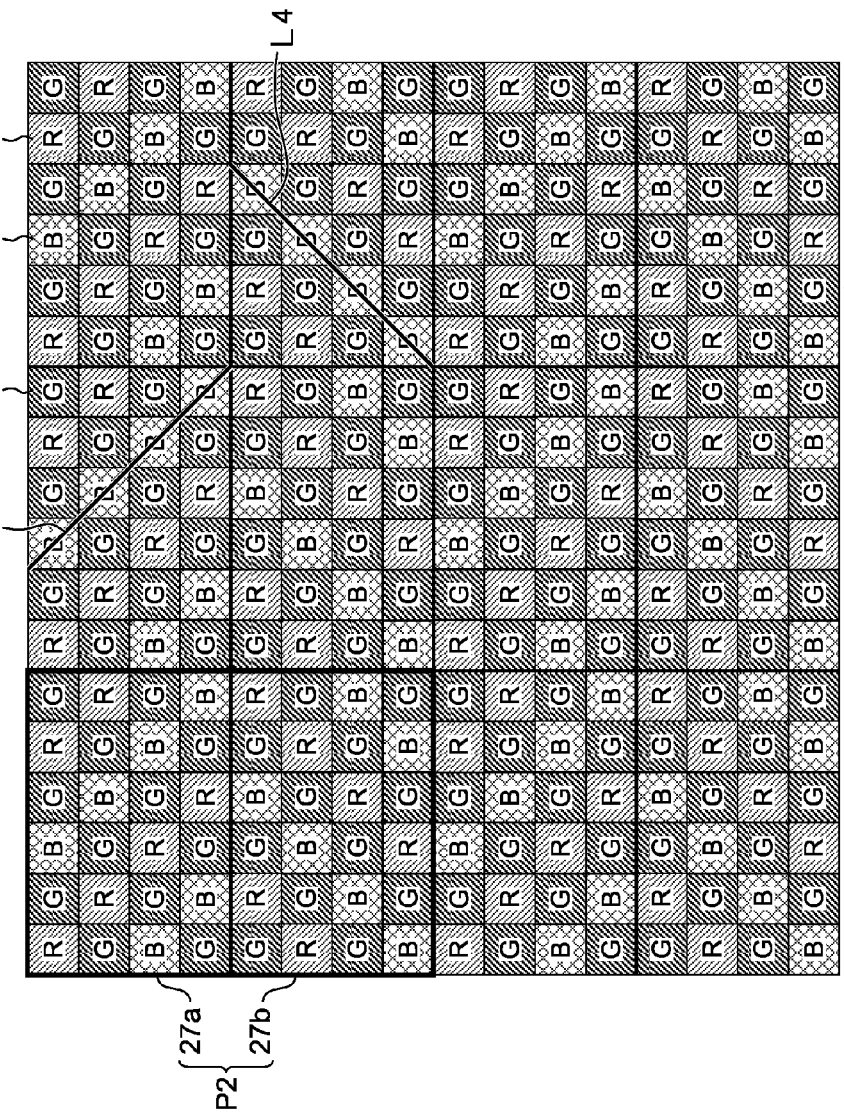
FIG. 12 is a diagram illustrating a third embodiment of the single-panel type color imaging device according to the presently disclosed subject matter.

FIG. 12 is a diagram illustrating the third embodiment of the single-panel type color imaging device according to the presently disclosed subject matter and specifically illustrates the color filter array of the color imaging device. Although above basic array pattern P1 of the second embodiment includes four kinds of subarrays of A, B, C, and D arrays 27a to 27d in total, the a basic array pattern includes two kinds of sets of subarrays in the color imaging device 30 of the third embodiment.

Also, since the third embodiment has basically the same configuration as the above first and second embodiments except for that the color filter arrays are different, the same reference characters are assigned to the same functions and configurations as in these embodiments and their explanation is omitted (the same applies to each embodiment after the fourth embodiment).

The color filter array of the color imaging device 30 (hereinafter simply referred to as "color filter array") includes basic array pattern P2 in which RGB filters 23R, 23G and 23B are arrayed in an array pattern corresponding to 8×6 pixels, and this basic array pattern P2 is repeatedly arranged in the horizontal direction and vertical direction. Therefore, the color filter array has above feature (1).

Figure 13:
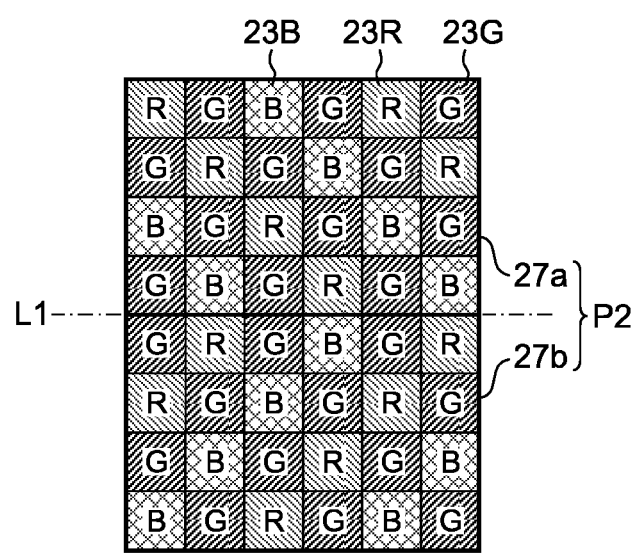
FIG. 13 is a diagram illustrating a basic array pattern included in the color filter array of the color imaging device of the third embodiment.

As illustrated in FIG. 13, basic array pattern P2 is formed with a set of A array 27a and B array 27b which are adjacent to each other in the vertical direction and in which the arrangements of G filters 23G have a mirror image relationship with respect to borderline L1.

Thus, in a case where basic array pattern P2 satisfies above conditions 1 and 2 and condition 3A in which the arrangements of G filters 23G in subarrays (both arrays 27a and 27b) that are adjacent in the vertical direction have a mirror image relationship, as illustrated in FIG. 12, G blank line L4 does not pass through both of two corners (intersection of borderline L1 and borderline L2) located on the opposite-angle positions of both arrays 27a and 27b. As a result, the diagonal (NE, NW) lines are not generated in which G filter 23G is not arranged, in the color filter array. Moreover, the horizontal and vertical lines are not generated in which G filter 23G is not arranged because condition 2 is satisfied. By this means, the color filter array has above feature (2).

Returning to FIG. 12, R filter 23R and B filter 23B are arranged in each line in the horizontal and vertical directions of the color filter array in basic array pattern P2 as well as the first and second embodiments. In addition, because the number of pixels of RGB pixels in basic array pattern P2 are 12 pixels, 24 pixels and 12 pixels respectively, the ratio of the number of respective pixels is 1:2:1. By this means, the color filter array has above feature (4) and feature (3).

Here, A array 27a and B array 27b are not point symmetrical with respect to the center of basic array pattern P2 and the color filter array does not include G square array 25.

As described above, the color filter array of the third embodiment has the same features as features (1), (2), (3) and (4) of the first embodiment.

{Fourth Embodiment of Color Imaging Device}

Figure 14:
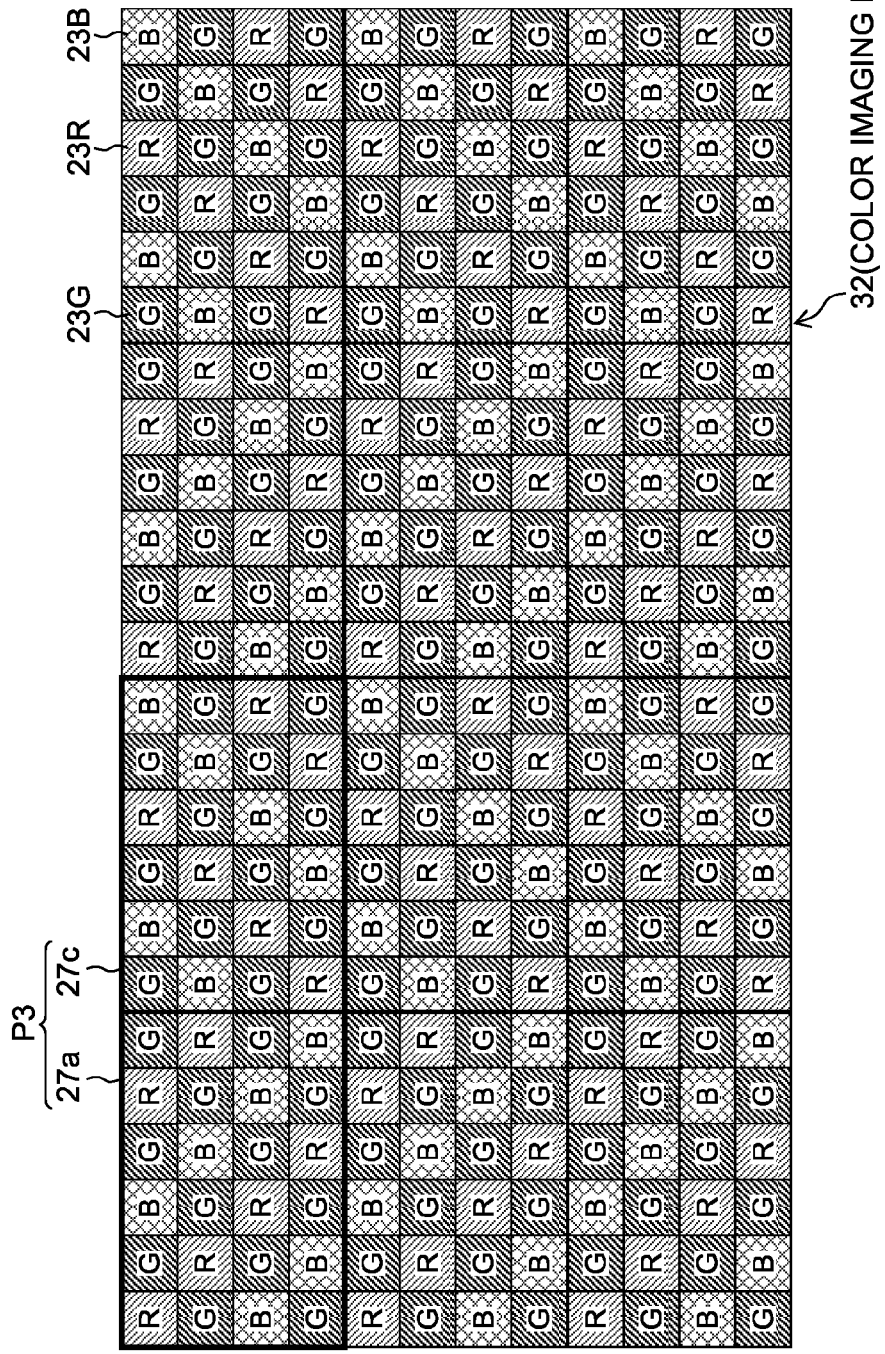
FIG. 14 is a diagram illustrating a fourth embodiment of the single-panel type color imaging device according to the presently disclosed subject matter.

FIG. 14 is a diagram illustrating the fourth embodiment of the single-panel type color imaging device according to the presently disclosed subject matter and specifically illustrates the color filter array of the color imaging device. Basic array pattern P2 of the above third embodiment is formed with a set of A array 27a and B array 27b that are adjacent to each other in the vertical direction. By contrast with this, a basic array pattern is formed with a set of two kinds of subarrays that are adjacent to each other in the horizontal direction in a color imaging device 32 of the fourth embodiment.

The color filter array of the color imaging device 32 (hereinafter simply referred to as "color filter array") includes basic array pattern P3 in which RGB filters 23R, 23G and 23B are arrayed in an array pattern corresponding to 4×12 pixels, and this basic array pattern P3 is repeatedly arranged in the horizontal direction and vertical direction. Therefore, the color filter array has above feature (1).

Figure 15:
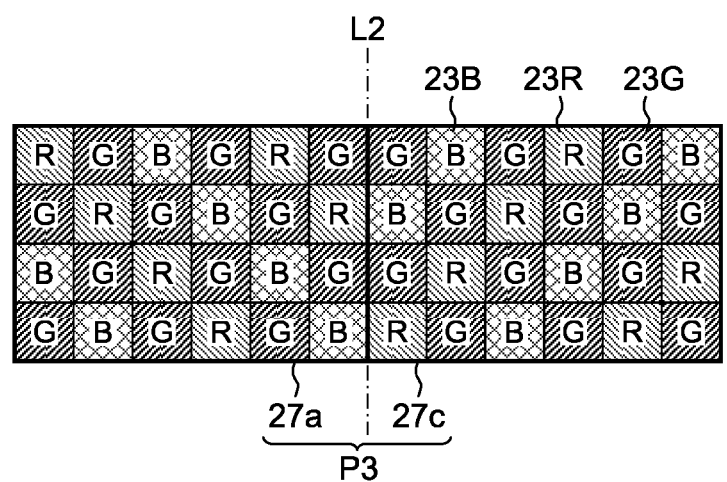
FIG. 15 is a diagram illustrating a basic array pattern included in the color filter array of the color imaging device of the fourth embodiment.

As illustrated in FIG. 15, each basic array pattern P3 is formed with a set of A array 27a and C array 27c which are adjacent to each other in the horizontal direction and in which the arrangements of G filters 23G have a mirror image relationship with respect to borderline L2. Thus, even in a case where basic array pattern P3 satisfies above conditions 1 and 2 and condition 3B that the arrangements of G filters 23G in subarrays (both arrays 27a and 27c) that are adjacent to each other in the horizontal direction have a mirror image relationship, G filter 23G is arranged in each line in the horizontal, vertical, and diagonal (NE, NW) directions of the color filter array, by the reason similar to the third embodiment. By this means, the color filter array has above feature (2).

Moreover, R filter 23R and B filter 23B are arranged in each line in the horizontal and vertical directions of the color filter array in basic array pattern P3 as well as the third embodiment. In addition, the ratio of the number of pixels of RGB pixels is the same as the third embodiment. By this means, the color filter array has above feature (4) and feature (3).

Here, A array 27a and C array 27c are not point symmetrical with respect to the center of basic array pattern P3 and the color filter array does not include G square array 25.

As described above, the color filter array of the fourth embodiment has the same features as features (1), (2), (3) and (4) of the first embodiment.

{Fifth Embodiment of Color Imaging Device}

Figure 16:
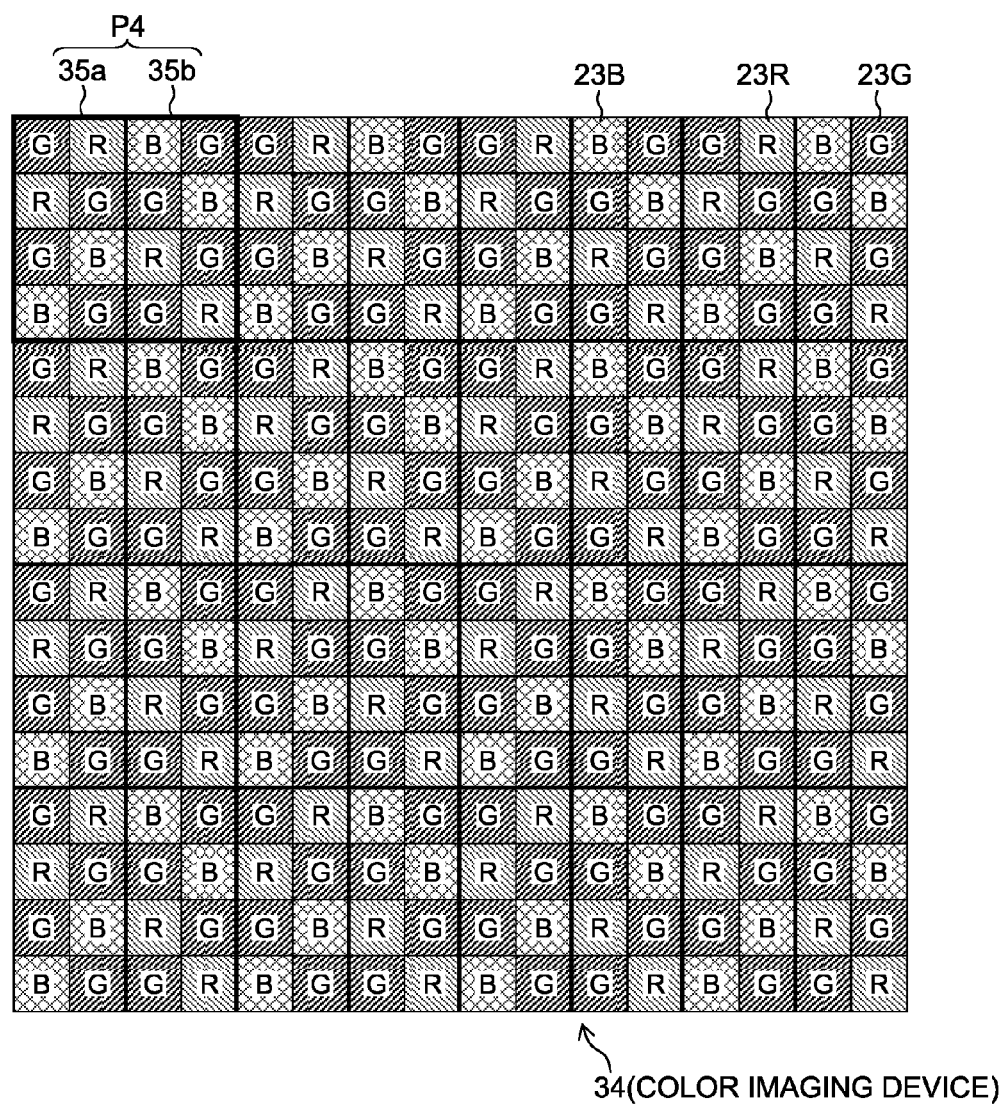
FIG. 16 is a diagram illustrating a fifth embodiment of the single-panel type color imaging device according to the presently disclosed subject matter.

FIG. 16 is a diagram illustrating the fifth embodiment of the single-panel type color imaging device according to the presently disclosed subject matter and specifically illustrates the color filter array of the color imaging device. Although each of the subarrays (A, B, C and D arrays 27a to 27d) forming a basic array pattern has an array pattern corresponding to 4×6 pixels in the above first to fourth embodiments, each subarray has an array pattern corresponding to 4×2 pixels in a color imaging device 34 of the fifth embodiment.

The color filter array of the color imaging device 34 (hereinafter simply referred to as "color filter array") includes basic array pattern P4 in which RGB filters 23R, 23G and 23B are arrayed in an array pattern corresponding to 4×4 pixels. This basic array pattern P4 is repeatedly arranged in the horizontal and vertical directions. Therefore, the color filter array has above feature (1).

Figure 17:
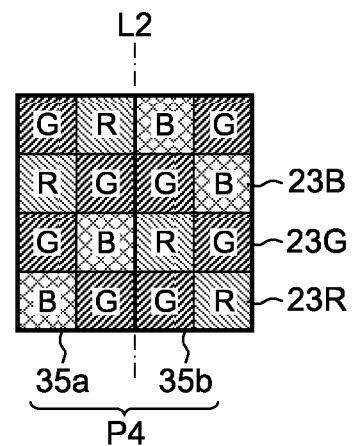
FIG. 17 is a diagram illustrating a basic array pattern included in the color filter array of the color imaging device of the fifth embodiment.

As illustrated in FIG. 17, basic array pattern P4 has an array pattern corresponding to 4×2 pixels and is formed with a set of A array 35a and B array 35b that are adjacent to each other in the horizontal direction. G filters 23G are arranged in a checkered pattern in both arrays 35a and 35b respectively. In addition, the arrangement of G filters 23G in A array 35a and the arrangement of G filters 23G in B array 35b have a mirror image relationship with respect to borderline L2.

Thus, because basic array pattern P4 satisfies above conditions 1, 2 and 3B, G filter 23G is arranged in each line in the horizontal, vertical and diagonal (NE, NW) directions of the color filter array as well as the fourth embodiment. By this means, the color filter array has above feature (2).

R filter 23R and B filter 23B are arranged in each line in the horizontal, vertical and diagonal (NE, NW) directions of the color filter array in basic array pattern P4 as well as each above embodiment. Therefore, the color filter array has above feature (4).

Figure 18:
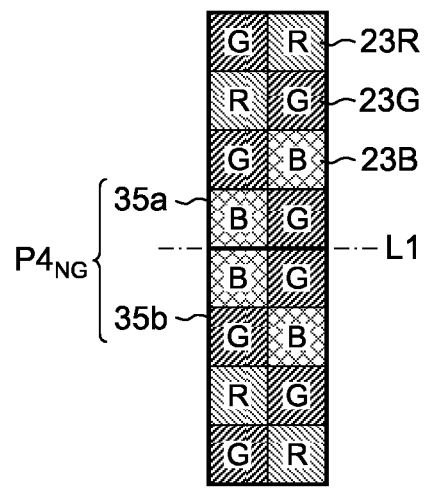
FIG. 18 is a diagram that is used to explain a comparative example of a basic array pattern in which one or more R filters and one or more B filters are not arranged in lines in the horizontal and vertical directions of the color filter array.

At this time, for example, like the comparative example illustrated in FIG. 18, basic array pattern $P4_{NG}$ formed with a set of A array 35a and B array 35b that are adjacent to each other in the vertical direction is provided such that RGB filters 23R, 23G and 23B are arranged in an array pattern corresponding to 8×2 pixels. In this case, R filter 23R and B filter 23B cannot be arranged in each line in the horizontal, vertical and diagonal (NE, NW) directions of the color filter array in basic array pattern $P4_{NG}$. Therefore, in a case where subarrays (A array 35a and B array 35b) are provided in an array pattern corresponding to 4×2 pixels (similar in the case of 2×4 pixels), the basic array pattern has to be set to an array pattern corresponding to 4×4 pixels.

Returning to FIG. 16, the number of pixels of RGB pixels in basic array pattern P4 are 4 pixels, 8 pixels and 4 pixels respectively, and, since the ratio of the number of pixels is 1:2:1, the color filter array has above feature (3). Meanwhile, in the fifth embodiment, A array 35a and B array 35b are not point symmetrical with respect to the center of basic array pattern P4, and the color filter array does not include G square array 25.

Figure 19:
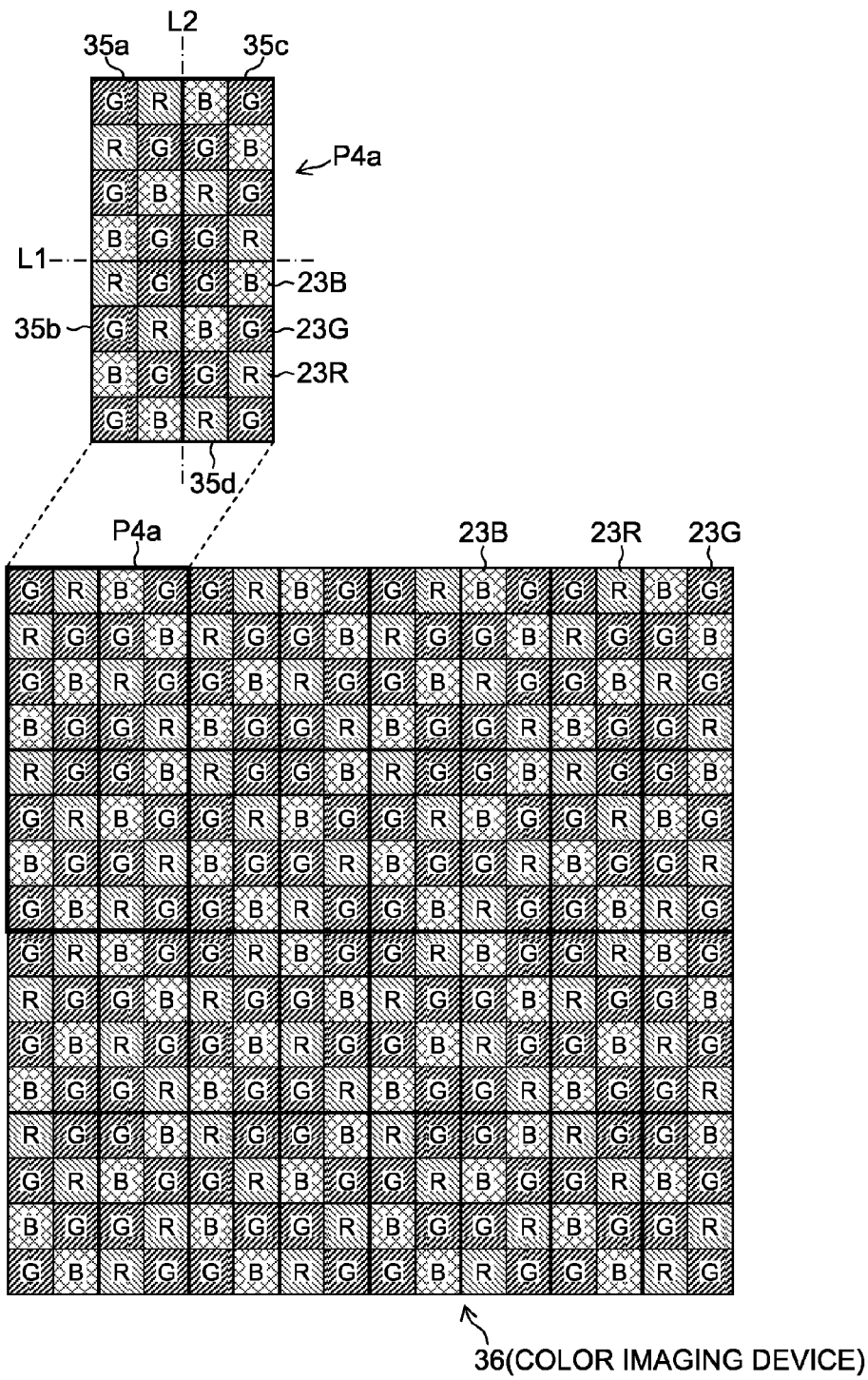
FIG. 19 is a diagram illustrating the color imaging device of another embodiment in which the number of subarrays that form the basic array pattern is made larger than the fifth embodiment.

As described above, the color filter array of the fifth embodiment has the same features as features (1), (2), (3) and (4) of the first embodiment. Here, although basic array pattern P4 is formed with A array 35a and B array 35b in the above fifth embodiment, basic array pattern P4a may be formed with four kinds of A, B, C and D arrays 35a, 35b, 35c and 35d arranged in a matrix manner so as to be adjacent to each other in the horizontal and vertical directions, like a color imaging device 36 illustrated in FIG. 19, for example.

Arrays 35a to 35d are basically the same as arrays 27a to 27d of the second embodiment except for that they are an array pattern corresponding to 4×2 pixels. Moreover, the color filter array includes G square array 25. Therefore, the color filter array formed with basic array pattern P4a has features (1), (2), (3), (4) and (5) of the first embodiment.

{Sixth Embodiment of Color Imaging Device}

Figure 20:
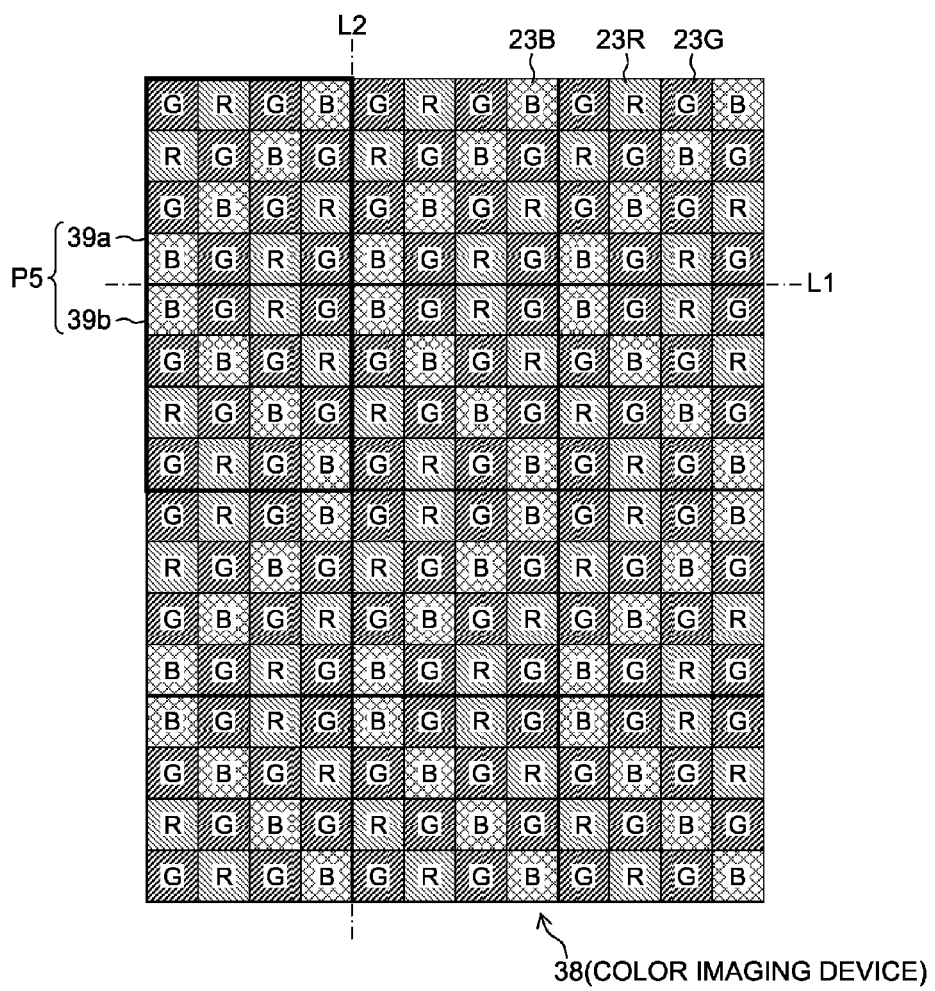
FIG. 20 is a diagram illustrating a sixth embodiment of the single-panel type color imaging device according to the presently disclosed subject matter.

FIG. 20 is a diagram illustrating the sixth embodiment of the single-panel type color imaging device according to the presently disclosed subject matter and specifically illustrates the color filter array of the color imaging device. Although each subarray forming the basic array pattern of the above second to fifth embodiments has an array pattern corresponding to M×N (M<N and both are even numbers) pixels, each subarray has a square array pattern corresponding to M×N (M=N and both are even numbers equal to or greater than 4) pixels in the color imaging device 36 of the sixth embodiment.

The color filter array of the color imaging device 36 (hereinafter simply referred to as "color filter array") includes basic array pattern P5 in which RGB filters 23R, 23G and 23B are arrayed in an array pattern corresponding to 8×4 pixels. This basic array pattern P5 is repeatedly arranged in the horizontal direction and vertical direction. Therefore, the color filter array has above feature (1).

Basic array pattern P5 is formed with a set of A array 39a and B array 39b that are adjacent to each other in the vertical direction. Both arrays 39a and 39b have an array pattern corresponding to 4×4 pixels, respectively.

G filter 23G is arranged in a checkered pattern in both arrays 39a and 39b, respectively. Moreover, the arrangement of G filters 23G in A array 39a and the arrangement of G filters 23G in B array 39b have a mirror image relationship with respect to borderline L1.

Thus, both arrays 39a and 39b have a square array pattern (condition 1A). In addition, in a case where above condition 2 and condition 3A are satisfied, G filter 23G is arranged in each line in the horizontal, vertical and diagonal (NE, NW) directions of the color filter array. By this means, the color filter array has above feature (2).

R filter 23R and B filter 23B are arranged in each line in the horizontal and vertical directions of the color filter array in basic array pattern P5 as well as each above embodiment. In addition, because the number of pixels of RGB pixels in basic array pattern P5 are 8 pixels, 16 pixels and 8 pixels, respectively, the ratio of each number of pixels is 1:2:1. By this means, the color filter array has above feature (4) and feature (3).

Meanwhile, in the sixth embodiment, A array 38a and B array 38b are not point symmetrical with respect to the center of basic array pattern P5 and the color filter array does not include G square array 25.

As described above, the color filter array of the sixth embodiment has the same features as features (1), (2), (3) and (4) of the first embodiment.

Figure 21:
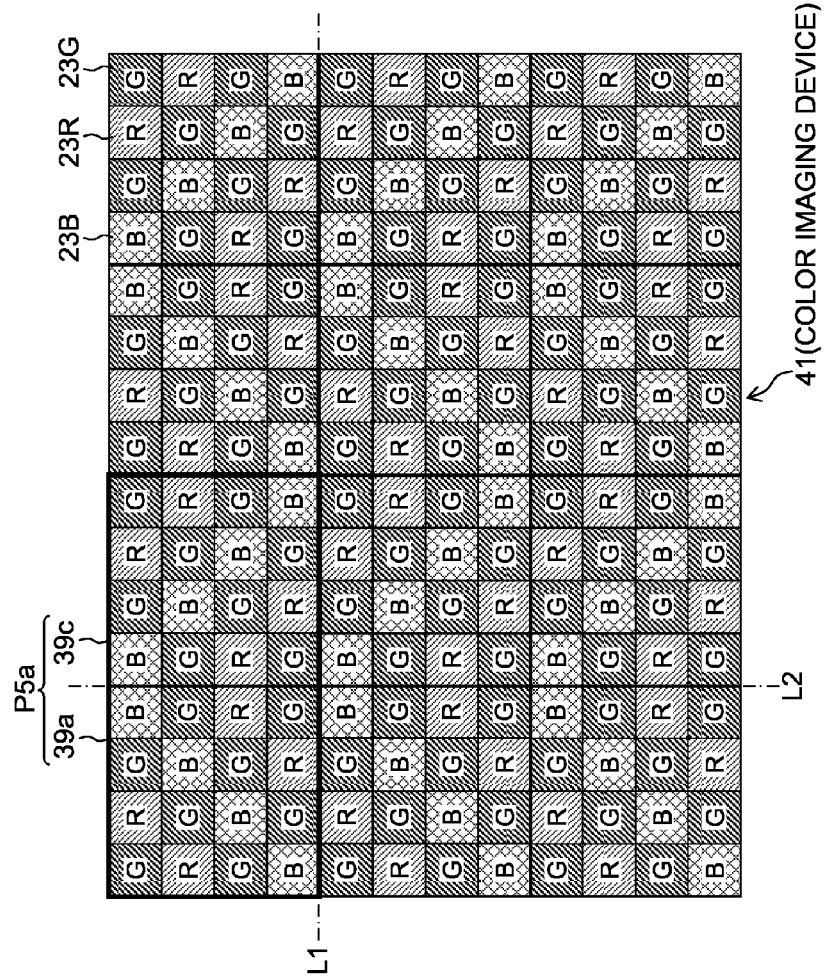
FIG. 21 is a diagram illustrating the color imaging device of another embodiment in which the arrangement of subarrays that form the basic array pattern is different from the sixth embodiment.
Figure 22:
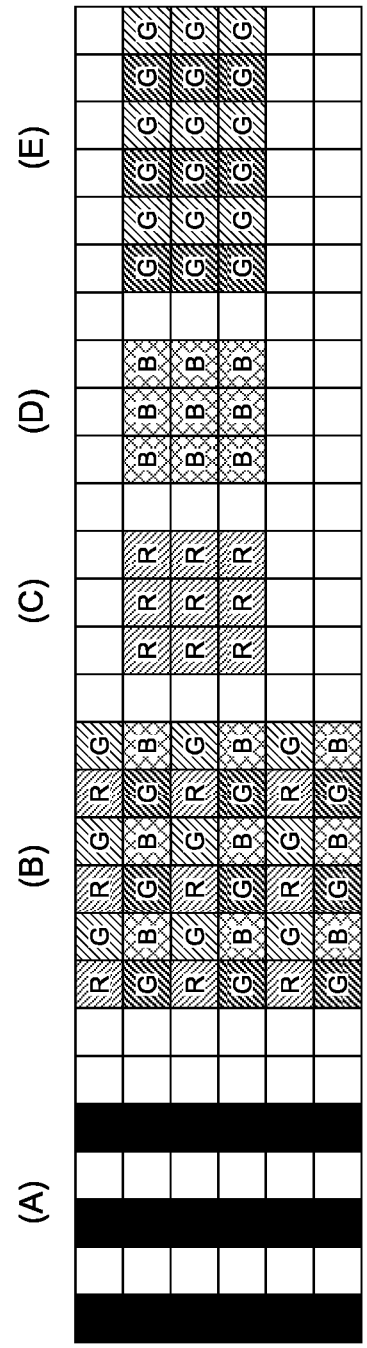
FIG. 22 is a diagram that is used to explain a problem of the color imaging device that has the color filters of the conventional Bayer array.
Figure 23:
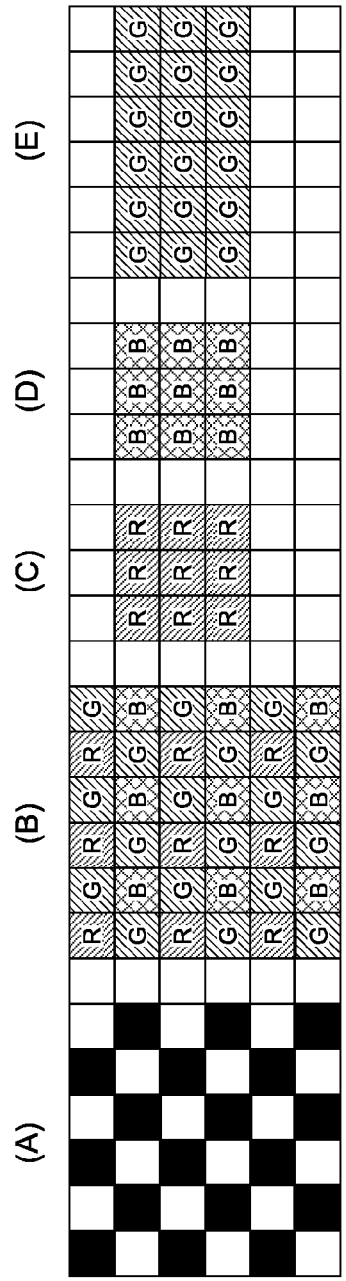
FIG. 23 is another diagram that is used to explain a problem of the color imaging device that has the color filters of the conventional Bayer array.

Here, although basic array pattern P5 is formed with A array 39a and B array 39b that are adjacent to each other in the vertical direction in the above sixth embodiment, for example, basic array pattern P5a may be formed with a set of A array 39a and C array 39c that are adjacent to each other in the horizontal direction, like a color imaging device 41 illustrated in FIG. 21.

G filters 23G are arranged in a checkered pattern in C array 39c. Moreover, they are arranged such that the arrangement of G filters 23G in C array 39c and the arrangement of G filters 23G in A array 39a have a mirror image relationship with respect to borderline L2. Thus, even in a case where basic array pattern P5a satisfies above conditions 1A, 2 and 3B, G filter 23G is arranged in each line in the horizontal, vertical and diagonal (NE, NW) directions of the color filter array. By this means, the color filter array has above feature (2).

Moreover, by arranging R filter 23R and B filter 23B in each line in the horizontal and vertical directions of the color filter array in basic array pattern P5a, the color filter array has above features (3) and (4) as well as the above sixth embodiment.

At this time, although C array 39c illustrated in FIG. 21 has the same configuration as B array 39b of the above sixth embodiment, the array of R filter 23R and B filter 23B may be changed as long as the above feature (4) is satisfied.

As described above, the color filter array formed with basic array pattern P5a also has the same features as features (1), (2), (3) and (4) of the first embodiment.

{Others}

Although a basic array pattern is formed with subarrays having an array pattern corresponding to 4×6 pixels in the above second to fourth embodiments, it may be formed with subarrays having an array pattern corresponding to M×N (M<N and both are even numbers) pixels. Moreover, although a basic array pattern is formed with subarrays having an array pattern corresponding to 4×4 pixels in the above sixth embodiment, it may be formed with subarrays having an array pattern corresponding to M×N (M=N and both are even numbers) pixels. Here, in these embodiments, it is preferable that N (as well as M) is equal to or less than 10. This is because a special effect cannot be obtained by enlarging the size of the basic array pattern while signal processing such as synchronization becomes complicated in a case where N (M is also similar) exceeds 10 (N, M>10).

An explanation has been given using, as an example, a basic array pattern including one or two sets of subarrays which are adjacent to each other and in which the arrangements of G filters 23G have a mirror image relationship (specifically, two or four subarrays) in the above second to sixth embodiments, the basic array pattern may be formed with a set of three or more subarrays (i.e., six or more subarrays).

The arrangement of R filter 23R and B filter 23B of each above embodiment is not limited to the arrangement illustrated in FIGS. 3 to 21, and may be adequately changed within a range to satisfy at least above feature (4).

Although the color filter array of color filters of three primary colors of RGB has been described in each above embodiment, for example, the color filter array of color filters of four colors in which another color (for example, emerald (E)) is added to the three primary colors of RGB may be employed.

Moreover, the presently disclosed subject matter can be applied to a color filter array of color filters of C (cyan), M (magenta) and Y (yellow) that are complementary colors of primary colors of RGB, or a color filter array of color filters of a complementary color system of four colors in which G is added to the complementary colors.

In addition, it is needless to say that the presently disclosed subject matter is not limited to the above embodiments and various changes are possible without departing from the spirit of the presently disclosed subject matter.

What is claimed is:

1. A single-panel type color imaging device configured by arranging color filters of a certain color filter array on a plurality of pixels that are configured by photometric conversion elements that are arranged in a horizontal direction and a vertical direction, wherein the color filter array includes subarrays in which the color filters are arrayed in an array pattern corresponding to M×N (M is an even number equal to or greater than 2 and N is an even number equal to or greater than 4) pixels and the subarrays are repeatedly arranged in the horizontal direction and the vertical direction, the color filters include a first filter corresponding to a first color that contributes most to obtain a brightness signal and second filters corresponding to second colors of two or more colors different from the first color, and a ratio of a number of pixels of the first color corresponding to the first filter is larger than each ratio of a number of pixels of the second colors corresponding to the second filters, the first filter is arranged in a checkered pattern in the subarrays such that an arrangement of the first filter in one of the subarrays that are adjacent to each other in the horizontal direction or the vertical direction and an arrangement of the first filter in another have a mirror image relationship, and one or more of the second filters corresponding to each color of the second colors are arranged in each line in the horizontal direction and the vertical direction of the color filter array in a basic array pattern which is repeatedly arranged in the horizontal direction and the vertical direction in the color filter array and which includes K (K is a natural number equal to or greater than 1) sets of the subarrays that are adjacent to each other and have a mirror image relationship in the arrangement of the first filter.

2. The color imaging device according to claim 1, wherein the basic array pattern is formed with one of the sets.

3. The color imaging device according to claim 2, wherein the basic array pattern is an array pattern corresponding to 4×4 pixels in a case where the M×N is 2×4.

4. The color imaging device according to claim 3, wherein the M and N are even numbers equal to or less than 10.

5. The color imaging device according to claim 2, wherein the M and N are even numbers equal to or less than 10.

6. The color imaging device according to claim 1, wherein the basic array pattern is formed with four of the subarrays which are adjacent to each other in the horizontal direction and the vertical direction and which have a mirror image relationship in the arrangement of the first filter between the adjacent subarrays when the M and the N are different from each other.

7. The color imaging device according to claim 6, wherein the M and N are even numbers equal to or less than 10.

8. The color imaging device according to claim 1, wherein the M and N are even numbers equal to or less than 10.

9. The color imaging device according to claim 1, wherein the first color is a green (G) color, and the second colors are a red (R) color and a blue (B) color.

* * * * *